(12) United States Patent
Maheshwari et al.

(10) Patent No.: US 10,459,657 B2
(45) Date of Patent: Oct. 29, 2019

(54) STORAGE SYSTEM WITH READ CACHE-ON-WRITE BUFFER

(71) Applicant: Nimble Storage, Inc., San Jose, CA (US)

(72) Inventors: Umesh Maheshwari, San Jose, CA (US); Suresh Vasudevan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/482,708

(22) Filed: Apr. 7, 2017

(65) Prior Publication Data

US 2018/0081591 A1 Mar. 22, 2018

Related U.S. Application Data

(60) Provisional application No. 62/396,050, filed on Sep. 16, 2016.

(51) Int. Cl.

| | |
|---|---|
| *G06F 3/06* | (2006.01) |
| *G06F 12/0891* | (2016.01) |
| *G06F 12/0875* | (2016.01) |
| *G06F 12/1045* | (2016.01) |
| *G06F 9/455* | (2018.01) |

(52) U.S. Cl.
CPC ............ *G06F 3/0656* (2013.01); *G06F 3/061* (2013.01); *G06F 3/0608* (2013.01); *G06F 3/0625* (2013.01); *G06F 3/0685* (2013.01); *G06F 12/0875* (2013.01); *G06F 12/0891* (2013.01); *G06F 12/1045* (2013.01); *G06F 9/45533* (2013.01); *G06F 9/45558* (2013.01); *G06F 2009/45562* (2013.01); *G06F 2212/452* (2013.01); *G06F 2212/60* (2013.01); *Y02D 10/154* (2018.01)

(58) Field of Classification Search
CPC .................... G06F 12/0866; G06F 12/0868
See application file for complete search history.

(56) References Cited

U.S. PATENT DOCUMENTS

| | | |
|---|---|---|
| 9,483,187 B2 | 11/2016 | Karaje et al. |
| 2005/0132212 A1 | 6/2005 | Haswell |

(Continued)

*Primary Examiner* — Edward J Dudek, Jr.

(57) ABSTRACT

Methods and storage arrays are described. One example method is for storage processing on a storage array. The method includes executing a storage application on the storage array. The storage application is configured to process write commands and read commands to and from storage of the storage array, and the write commands and the read commands being from an application. The method includes, processing, by the storage application, a write command from the application. The processing includes storing data blocks of the write command to a write buffer of the storage array. The method also includes processing said data blocks, while processing said storing, to identify data blocks and/or metadata to store in a read cache-on-write buffer. In this example, only a sub-set of said data blocks are temporarily stored in said read cache-on-write buffer. The method includes draining data blocks, from time to time, from said read cache-on-write buffer to end storage of said storage. The draining includes producing data segments that include two or more of said data blocks.

22 Claims, 21 Drawing Sheets

(56) References Cited

U.S. PATENT DOCUMENTS

| | | | |
|---|---|---|---|
| 2009/0240911 A1* | 9/2009 | Yamada | G06F 3/0605 711/171 |
| 2009/0313426 A1* | 12/2009 | See | G06F 3/0613 711/112 |
| 2011/0231598 A1* | 9/2011 | Hatsuda | G06F 12/0804 711/103 |
| 2012/0017034 A1* | 1/2012 | Maheshwari | G06F 12/0866 711/103 |
| 2014/0067994 A1 | 3/2014 | Naga et al. | |
| 2014/0223094 A1* | 8/2014 | Baderdinni | G06F 3/0689 711/114 |
| 2015/0134915 A1* | 5/2015 | de la Iglesia | G06F 12/122 711/136 |
| 2015/0193342 A1 | 7/2015 | Ohara et al. | |
| 2016/0019146 A1 | 1/2016 | Vekiarides et al. | |
| 2018/0081591 A1 | 3/2018 | Maheshwari et al. | |

\* cited by examiner

WRITE - PATH

STORAGE SYSTEM WITH READ CACHE-ON-WRITE BUFFER

CLAIM OF PRIORITY

The present application claims priority to U.S. Provisional Patent Application No. 62/396,050, filed on Sep. 16, 2016, and entitled "Cloud Storage System," and is herein incorporated by reference.

FIELD OF THE EMBODIMENTS

The present disclosure provides systems and methods for processing storage operations, and in particular, storage systems and cloud storage operations that utilize in-memory cache for write operations. The in-memory cache is utilized to optimize processing for read operations, and in some embodiments, a sub-set data blocks from write operations are stored in the in-memory cache.

BACKGROUND

Storage arrays are used to store data. Commonly, storage arrays have at least one controller for managing access to storage media of the storage array. The storage media of a storage array may include one or more hard disk drives (HDDs) and/or one or more solid state drives (SSDs). Storage arrays are typically configured with connections to servers via one or more switches to enable efficient and reliable access between the servers and storage arrays.

Recently, there have been substantial improvements in cloud infrastructure. Cloud infrastructure is typically constructed by cloud service providers. Cloud service providers typically provide services for remote users, which include access to customized computing power to run applications and serve data to numerous remote users. The cloud infrastructure therefore includes server systems, which are typically virtualized.

In this manner, a cloud service provider can provide private and separate access to computing resources (i.e., virtual machines) to numerous customers. The cloud infrastructure is also configured with storage (e.g., which may use many networked storage arrays). This storage is also provided to customers, so that their custom applications can store and access data. Storage is typically installed in datacenters, along with servers and networking equipment. Because the various customers of the cloud service provider have different needs for storage, the cloud service provider will commonly offer different types of storage. These different types of storage may have different performance levels and pricing. Thus, for some customers of the cloud service provider, faster storage access is important, e.g., such as for cloud database processing and serving of such data. For other customers, storage capacity is more important, e.g., for cloud file sharing. As such, for said cloud file sharing, storage access speeds may not be as important. For these reasons, cloud service providers offer various times of storage solutions, each with different performance characteristics and price points for data capacity, data reads, data writes, etc.

Unfortunately, customers that are provisioned compute resources and storage, are provisioned based on an initial setup. Once the customer's applications are installed and storage is selected and assigned, the customer's applications are held to the fixed storage configuration. That is, if the customer is assigned a type of storage that is fast for random input/output (I/O), which might be the case for database-type programs, that storage type must also service operations associated with other application transactions, which may write data in larger linear chucks. As a result, customers that may have optimized their provisioned compute resources and storage initially, e.g., at set up or periodically, may suffer inefficiencies in storage utilization. Inefficient storage utilization may include deterioration in data access performance, delays in process, as well as inefficient use of storage on a per-transaction cost of using the selected storage types offered by the cloud service provider.

It is in this context that embodiments claimed herein arise.

SUMMARY

Methods, systems, storage systems, and computer readable media are provided for managing write operations. In one embodiment, a read cache-on-write buffer is used to store a sub-set of write buffer data. All written data blocks are still initially stored to a write cache (i.e., write buffer), but the sub-set of write buffer data stored to the read cache-on-write buffer are those that are likely to be read more frequently. In some embodiments, these data blocks are considered hot, while data blocks that are less likely to be read as frequently are considered cold. In other embodiments, the sub-set of write buffer data stored to the read cache-on-write buffer are those that belong to certain applications, e.g., those that have been pre-identified as having a frequent read pattern that exceeds defined threshold.

In one embodiment, a method is for storage processing on a storage array is provided. The method includes executing a storage application on the storage array. The storage application is configured to process write commands and read commands to and from storage of the storage array, and the write commands and the read commands being from an application. The method includes, processing, by the storage application, a write command from the application. The processing includes storing data blocks of the write command to a write buffer of the storage array. The method also includes processing said data blocks, while processing said storing, to identify data blocks and/or metadata to store in a read cache-on-write buffer. In this example, only a sub-set of said data blocks are temporarily stored in said read cache-on-write buffer. The method includes draining data blocks, from time to time, from said read cache-on-write buffer to end storage of said storage. The draining includes producing data segments that include two or more of said data blocks.

In one configuration, the method includes processing, by the storage application, a read command from the application. The processing includes initially reading data blocks from said read cache-on-write buffer. For data blocks not found in the read cache-on-write buffer, reading from said write buffer.

In one configuration, the method includes processing, for data blocks not found in write buffer, reading from said read cache, and if not found in said read cache, reading from said end storage.

In one configuration, a storage array is provided, which includes sub-set logic for handling the identification of data blocks being written and determination as to whether certain data blocks and/or metadata should be written to the read cache-on-write buffer. A storage application 402 of the storage array, which functions as an operating system of the storage array includes the sub-set logic for handling data blocks and provides access to the read cache-on-write buffer. In alternate configuration, a cloud storage system is provided, which includes sub-set logic for handling the identification of data blocks being written and determination as to whether certain data blocks should be written to the read cache-on-write buffer. A storage application 302 of the cloud storage system, which functions as an operating system includes the sub-set logic for handling data blocks and provides access to the read cache-on-write buffer.

In one embodiment, a method for storage processing on a storage array is provided. This method includes executing a storage application on the storage array to process write commands and read commands to and from storage of the storage array. The write commands and the read commands are for an application. The storage application processes a write command from the application by storing data blocks of the write command to a write cache of block storage that is part of the storage array. The method also includes processing said data blocks to manage writing said data blocks to a read cache-on-write buffer, such that a sub-set of said data blocks are held in said read cache-on-write buffer. The method includes writing select ones of the data blocks from said read cache-on-write buffer and/or said write cache of said block storage to a read cache of said block storage of the storage array and coalescing the data blocks obtained from said read cache-on-write buffer and/or data blocks obtained from said write cache of said block storage. The coalescing is configured to produce data segments that include two or more of said data blocks in sequential order, and then write or drain the produced data segments to segment storage that is part of the storage array. In a configuration, the read cache-on-write buffer is configured to store data blocks that are determined to be frequently used by said application, while evicting data blocks determined to be infrequently read by said application, such that a sub-set of written data blocks are maintained in said read cache-on-write buffer during processing by the storage application.

In some embodiments, the storage application is configured for examining the data blocks written to read cache-on-write buffer to determine if a threshold amount of data blocks are being written to the read cache-on-write buffer during a period of time. The storage application is configured for evicting the data blocks of the application when the threshold amount of data blocks are not being written to the read cache-on-write buffer during the period of time. In this manner, hot data is maintained in the read cache-on-write buffer, which is a sub-set of data being written to the write cache of the storage. Data determined to be cold is evicted from the read cache-on-write buffer.

In some embodiments, the read cache-on-write buffer is configured to store data blocks for one or more other applications that are writing. The storage application is configured to process sub-set logic to maintain data blocks associated with applications that are writing a threshold amount of data blocks during a period of time in the read cache-on-write buffer. Thus, the data blocks that are maintained in the read cache-on-write buffer during the period of time are determined to be hot, and data blocks that are evicted from the read cache-on-write buffer are determined to be cold during the period of time.

In another embodiment, a storage application, when operating on a compute node of the cloud infrastructure, is acting as a layer or interface that makes more efficient use of the different types of storage provided by the cloud service provider. In some embodiments, the storage application further executes storage management functions using memory provided to the compute node on which the storage application is running. These management functions include, for example, data reduction functions (e.g., deduplication, compression, garbage collection, etc.), selection of a different type of storage to function as write cache and read cache (e.g., in block storage), selection of a different type of storage to function as longer term storage (e.g., in object storage), functions to optimize writing to longer term storage, e.g., such as coalescing functions to sequentially arrange data to be written to object storage.

These example functions are provided by the storage application, which operates to make more efficient use of storage types provided by cloud service providers. This efficient use is useful in reducing processing power, reducing delays, and reducing inefficient cost spends when incorrectly formatted data is written to certain types of storage. As a result, customers of the cloud service provider can make more efficient use of storage, e.g., by way of utilizing the storage application as an interface or layer, which executes in the cloud. From the standpoint of the customer of the cloud service provider, the applications still run on compute nodes of the cloud service provider and they still use storage of the cloud service provider, albeit, the utilization of storage by said customers will be more efficient. This translates into higher performance for the customer and in some cases, reduced storage utilization costs.

In some embodiments, any one or all of the method operations described herein may be embodied in computer readable media, having non-transitory program instructions.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION

Figure 1:
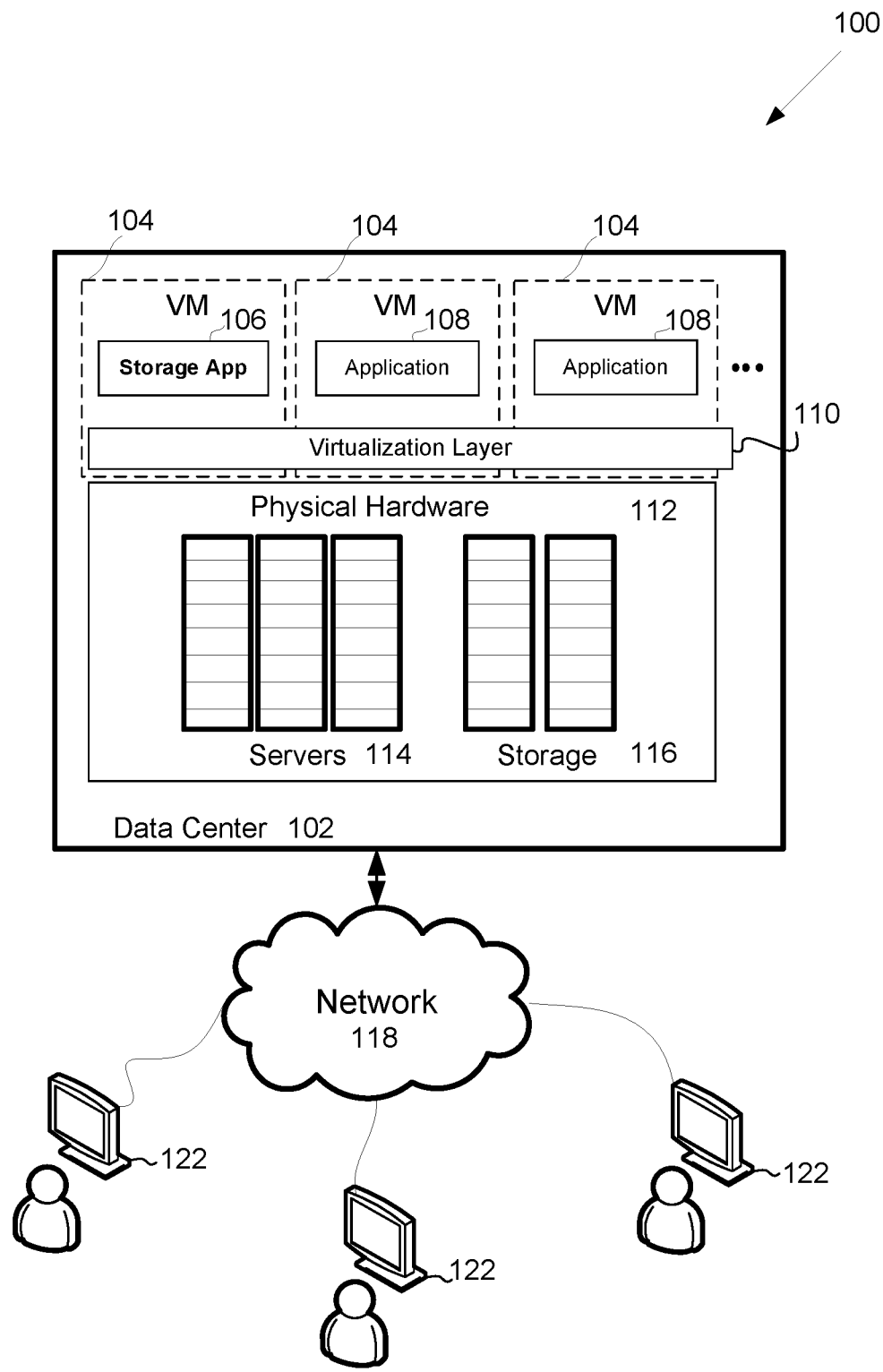
FIG. 1 illustrates an example cloud infrastructure, which provides processing and data services to clients, in accordance with one embodiment.

The following embodiments describe methods, systems, and computer programs for processing storage accesses, e.g., writes, reads and transfers of other commands to and from storage resources of a storage array and/or a cloud infrastructure. In one configuration, a storage array is provided, which includes sub-set logic for handling the identification of data blocks being written and determination as to whether certain data blocks should be written to the read cache-on-write buffer. A storage application 402 of the storage array, which functions as an operating system of the storage array includes the sub-set logic for handling data blocks and provides access to the read cache-on-write buffer. In alternate configuration, a cloud storage system is provided, which includes sub-set logic for handling the identification of data blocks being written and determination as to whether certain data blocks should be written to the read cache-on-write buffer. A storage application 302 of the cloud storage system, which functions as an operating system includes the sub-set logic for handling data blocks and provides access to the read cache-on-write buffer.

Various example systems and methods will now be described below with reference to the figures. Part I relates to cloud storage systems, and methods for executing storage applications on a processing node of a cloud service provider. Part II relates storage applications executed in a cloud compute node that use sub-set logic to identify and handle data block writes to a read cache-on-write buffer. Part III relates to storage applications executed in a storage array that implements sub-set logic to identify and handle data block writes to a read cache-on-write buffer. Some configurations may combined features from the various parts to define specific embodiments.

It should be understood that although description of specific examples are provided in each of the above-identified parts, features and/or operations of any one of the parts or any function or structure described herein may be combined to define specific implementations, regardless of what section or location such feature(s) and/or method operation(s) are described.

The cloud infrastructure, in one embodiment, is provisioned by a cloud service provider. The cloud service provider operates one or more datacenters, and said datacenters are used to service customers that install and operate applications. The applications, running on the cloud infrastructure, are typically referred to as cloud applications or cloud-based applications. These cloud applications may require different amounts of storage and/or different types of storage, depending upon the function of the applications, demands, client loads, stress requirements, and/or storage capacity. In one configuration, a method is executed on a compute node provisioned by the cloud service provider, which functions to execute a storage application. The storage application is configured as a layer that handles storage access needs of an application that is executed on another compute node (e.g., virtual machine) of the cloud service provider. In alternate configurations, the storage application and the application(s) may execute on the same compute node. The storage application is configured to handle write commands and read commands of the application and then direct the operations to two or more different types of storage provisioned by the cloud storage provider. The storage application, in one embodiment, is configured to operate similar to the way a storage operating system operates on physical storage array, but instead, uses different storage resources provisioned by the cloud service provider. The storage application, when provisioned in a cloud infrastructure, operates as a cloud storage system.

In some embodiments, the storage application further executes storage management functions using memory provided to the compute node on which the storage application is running. These management functions include, for example, data reduction functions (e.g., deduplication, compression, garbage collection, etc.), selection of a different type of storage to function as write cache and read cache (e.g., in block storage), selection of a different type of storage to function as longer term storage (e.g., object storage), functions to optimize writing to longer term storage, e.g., such as coalescing functions to sequentially arrange data to be written to object storage.

Various methods for storage processing on a cloud system are disclosed. One example method includes executing a storage application on a compute node of the cloud system. The storage application is configured to process write commands and read commands to and from storage of the cloud system, and the write commands and the read commands are from an application or multiple applications. The method further includes processing, by the storage application, a write command from the application. The processing includes storing data blocks of the write command to a write cache of a block storage that is part of the storage of the cloud system and processing said data blocks to manage writing said data blocks to a read cache-on-write buffer. A sub-set of said data blocks are held in said read cache-on-write buffer. The method further includes writing select ones of the data blocks from said read cache-on-write buffer and/or said write cache of said block storage to a read cache of said block storage of the cloud system. And, coalescing the data blocks obtained from said read cache-on-write buffer and/or data blocks obtained from said write cache of said block storage. The coalescing is configured to produce data segments that include two or more of said data blocks. The method includes writing the produced data segments to object storage that is part of the storage of the cloud system.

These example functions are provided by the storage application, which operates to make more efficient use of storage types provided by cloud service providers. This efficient operation is useful in reducing processing power, reducing delays, and reducing inefficient cost spends when incorrectly formatted data is written to certain types of storage. As a result, customers of the cloud service provider can make more efficient use of storage, e.g., by way of utilizing the storage application as an interface or layer, which executes in the cloud. From the standpoint of the customer of the cloud service provider, the applications still run on compute nodes of the cloud service provider and they still use storage of the cloud service provider, albeit, the utilization of storage by said customers will be more efficient. This translates into higher performance for the customer and in some cases, reduced storage utilization costs.

In some configurations, the storage application may be executed on multiple compute nodes, where each compute node services one application. In other configurations, the storage application may be executed on one compute node and from that compute node, the storage access functions of two or more applications may be services. In still other embodiments, each application may be provided with an instance of the storage application, which can be configured and adjusted to optimize the writing and reading of data to one or more of the storage resources of the cloud service provider. In further configurations, the storage application is provided with remote access to a management interface, which allows for customized provisioning of the storage application functions. For example, the customized provisioning may enable adjustments from time to time regarding the types of storage resources selected for particular applications. The adjustments may be for optimizing reads, the optimizations may be for optimizing writes, the optimizations may be to use new storage resources that may have been newly added to the cloud infrastructure by the cloud service provider.

In still other embodiments, the optimizations may be made programmatically, based on learned usage patterns of the application or based on learned metrics determined from other installations of the storage application. The learned metrics, in one embodiment, relate to metadata that describe the storage access operations, and not the data itself. Thus, some configurations, enable metadata analysis from multiple installations of the storage application, which can then be used to make dynamic changes to settings, recommend setting upgrades, recommend provisioning of different storage types, adjust compression settings, recommend adjustments to compression, adjust or recommend deduplication processing, adjust or recommend upgrades or downgrades in storage resources that may be provisioned, etc.

With this overview in mind, the following diagrams provide several example implementations of a storage application, provided to optimize the utilization of storage resources provided by a cloud storage provider.

Part I: Cloud Storage Systems, and Methods for Executing Storage Applications on a Processing Node of a Cloud Service Provider FIG. 1 illustrates an example cloud infrastructure 100, which provides processing and data services to clients 122. Clients 122 typically connect to the data center 102 over a network 118, to access the services provided by applications 108 that may be executing on virtual machines 104 of the cloud infrastructure 100. As shown, the network provides access to data center 102, but it should be understood that cloud infrastructure 100 may include multiple data centers 102, and the network 108 can include the Internet, which provides access to applications 108, which may be processed on one or more virtual machines 104. The virtual machines 104 are rendered using a virtualization layer 110. As shown, the application 108, associate to a virtual machine 104, can operate as if it were a standalone machine, but instead utilizes physical hardware 112. The physical hardware 112 includes servers 114 and storage 116. The physical hardware 112 is shared by the virtual machines 104, and to the application 108, the servers 114 and storage 116 provisioned to that virtual machines work as if the virtual machine were a physical provisioned machine. In this manner, the cloud infrastructure 100 is able to provision multiple virtual machines 104 and provide access to physical hardware 112 that is shared using virtualization layer 110.

In accordance with one embodiment, a storage application 106 is also configured to be executed on a virtual machine 104. By way of example, execution of the storage application 106 on the virtual machine 104 is processed by a compute node within the cloud infrastructure 100. Generally speaking, a compute node is one where processing power is provided by a portion servers 114, and storage access 116. In typical configurations, the cloud service provider will also allow customers to install their desired operating system within the compute node, such that there applications can run within the virtual machine 104. The storage application 106 running in one of the virtual machines 104 is configured to provide storage access services to one or more other applications 108. By way of example, storage application 106 executing on a compute node of the cloud infrastructure 100, can provide a layer interface between the storage access needs of the application 108 and the storage 116 that may be provisioned by the storage service provider to that application 108.

As used herein, the storage application 106 functions as a layer, since it operates to provide storage access to storage 116 and a customized format, that provides more efficient utilization of different types of storage 116 that may be provisioned by the cloud services provider. As mentioned above, the storage application 106 is configured to handle write operations and read operations in response to storage needs of the application 108. From the standpoint of application 108, the operations of storage application 106 are transparent, as the storage access is still provided to storage 116, albeit in a more efficient manner. The efficiency provided by the storage application 106 is that the layer provides for utilization of different types of storage 116 provided by the cloud infrastructure 100. Additionally, embodiments of the present invention enable processing by the storage application 106 to organize data that is to be written to the storage 116, such that more efficient utilization of the different types of storage 116 are achievable.

As will be described below, types of storage 116 that are commonly provisioned by cloud storage providers include storage that is optimized for block writing, and storage that is optimized for object writing. Block writing is typically associated with writing of non-sequential data, e.g. data blocks, whereas object writing is typically associated with writing of larger chunks of data that may be sequentially ordered. In one configuration, the storage application 106 is configured to optimize the selection data blocks to be written to block storage, and optimize processing of data before it is written to object storage. The optimized processing may include, for example, coalescing the data blocks such that data blocks are sequentially written in data segments.

Figure 2:
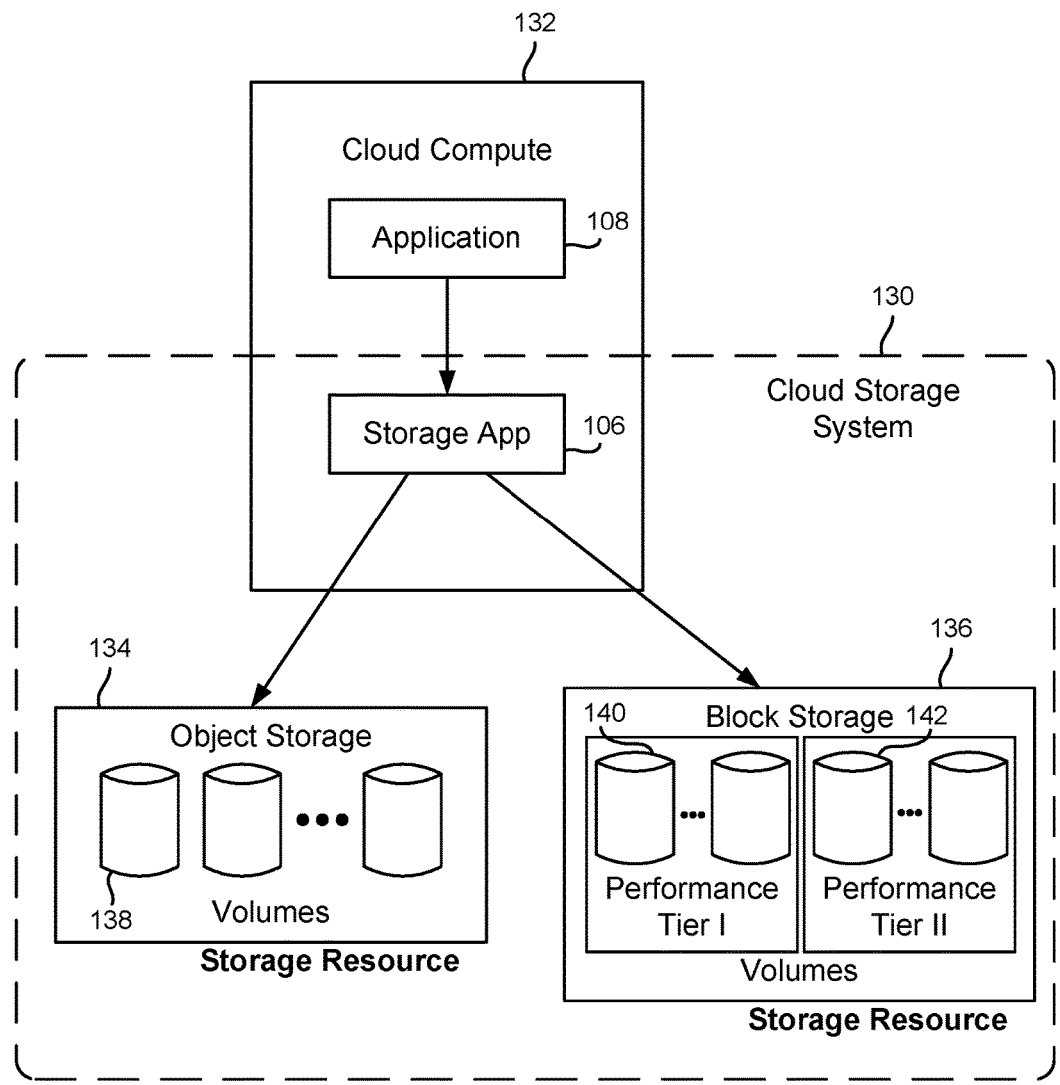
FIG. 2 illustrates an example of a cloud compute that may function to execute an application and storage application, in accordance with one embodiment of the present invention.

FIG. 2 illustrates an example of a cloud compute 132 that may function to execute an application 108 and storage application 106, in accordance with one embodiment of the present invention. In this example, the cloud compute 132 may be defined by one or more virtual machines 104, as described above. This illustration shows that application 108 will utilize storage application 106 as a layer or service for accessing storage resources of the storage 116 in the cloud infrastructure 100. Storage application 106 functions in coordination with the storage resources of the cloud service provider, which defines a cloud storage system 130. The cloud storage system 130 refers to the ability of operating specific storage access operations to different types of storage resources, in a way that manages the interface of storage access operations between application 108 and the various types of storage resources that may be offered by a cloud storage provider. In this example, without limitation to other types of storage resources, the storage resources include object storage 134 and block storage 136.

Object storage 134 is a type of storage provided by the cloud service provider, and is optimized for writing larger chunks of data. The larger chunks of data, are currently associated with sequentially written data for objects, such as photos, videos, images, and other types of digital content. As such, performance provided by object storage 134 is optimized for writing this type of larger content, e.g. being at least one megabyte or larger. Consistent with this optimization of object storage 134, if data is written to object storage 134 in a format that is not of larger chunks of data, the object storage 134 will be operating at a less than optimal configuration. As will be described in greater detail below, the storage application 106 is configured to utilize object storage 134 in an optimize manner, e.g., by sequentially writing larger chunks of data in the form of data segments.

As further shown, object storage 134 is typically provided in the form of volumes 138. Volumes may be used by the storage application 106 to write specific types of data, such as data for specific applications 108. In some embodiments, other volumes of object storage 134 may be used for other types of applications 108. In alternative examples, storage application 106 can write to multiple volumes, such as to stripe data in accordance with specific writing techniques. Broadly speaking, object storage 134 may be defined by one or more volumes, and the object storage 134 may be distributed among one or more data centers, where such storage resources provided to one or more applications 108.

Block storage 136 is a type of storage provided by the cloud service provider, and is optimized for writing smaller block data, e.g., such as that produced by applications or processes that generate random input/outputs (I/Os). Block storage 136, similar to object storage 134, is also provided with the capability of assigning one or more volumes 140 and 142 for the type of data stored in block storage 136. Additionally, block storage 136 may be further separated into different performance tiers, such as the example performance tier I associated with volumes 140, and performance tier II associated with volumes 142. These performance tiers are designed to provide a different type of block storage capability for applications 108 that utilize storage resources of the cloud service provider. In accordance with one embodiment, it is possible to allocate certain volumes 140 to performance tier I, and allocate certain other volumes 142 to performance tier II.

It should be appreciated that block storage 136 can also have further levels of performance tiers, depending on the storage resources provided by the cloud storage provider. In some embodiments, the different types of block storage provided as storage resources are referred to as elastic block storage, since they are individually provisioned for the types of storage requirements desired by the application 108 or multiple applications 108. In some embodiments, different types of block storage 136 may be configured from different types of physical storage, such as hard disk drives, solid-state drives, faster solid-state drives, nonvolatile memory, and other types of memory or drive structures. Most commonly, block storage 136 is partitioned into different types of solid-state drives, each type having different levels of performance, e.g., performance tiers.

In one embodiment, the storage application 106 will utilize block storage 136, and specifically different types of performance tiers within block storage 136 to optimize storage transactions required by application 108. By incorporating storage application 106 as a layer between the application 108 and the storage resources, a cloud storage system 130 is defined, which handles the storage access requirements of application 108 and other applications that may be executing on cloud compute nodes of a cloud infrastructure, provisioned by a cloud service provider.

Figure 3:
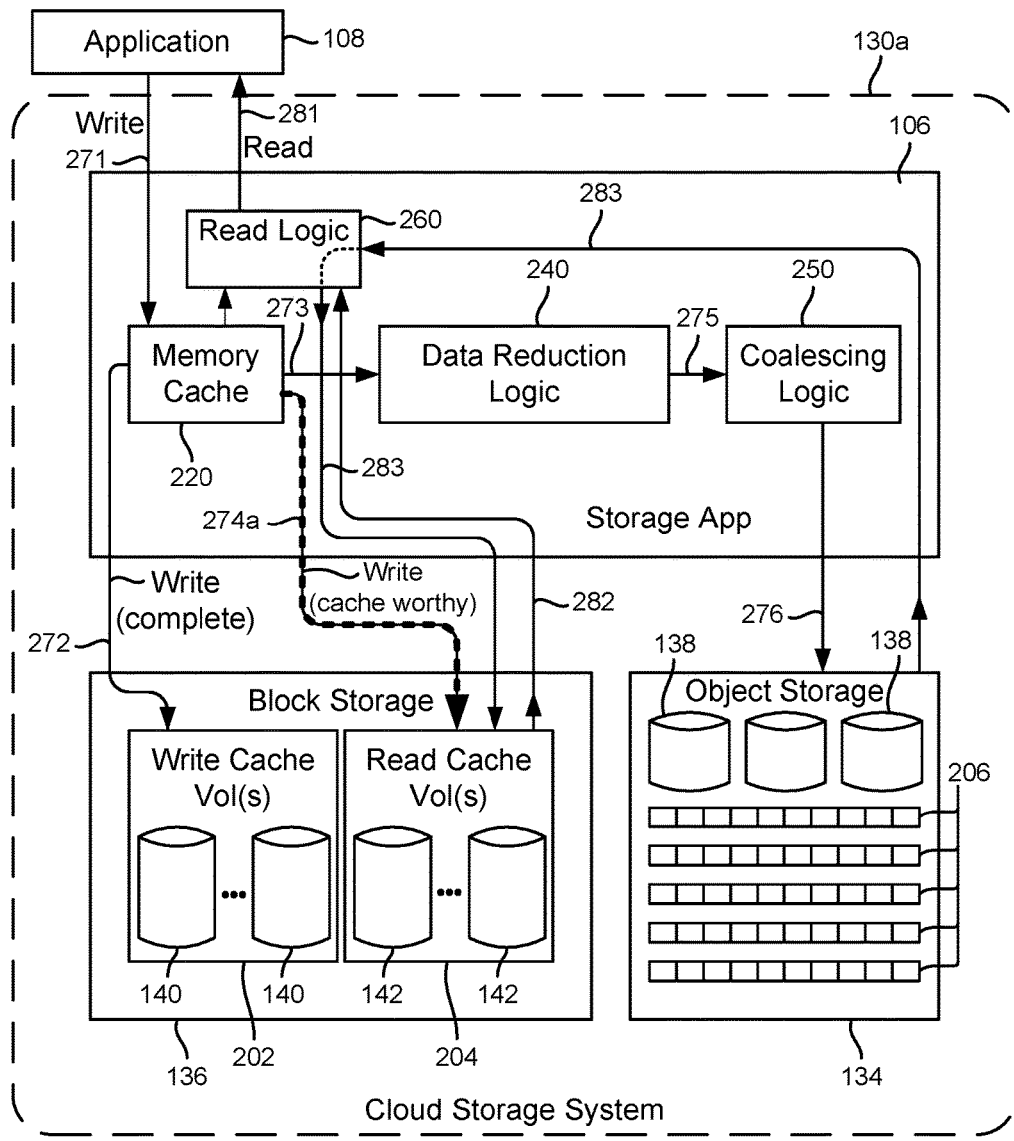
FIG. 3 illustrates an example configuration of cloud storage system, which is configured to include storage application for processing writes and reads between application and storage resources of the cloud service provider.

FIG. 3 illustrates an example configuration of cloud storage system 130a, which is configured to include storage application 106 for processing writes and reads between application 108 and storage resources of the cloud service provider. In this example, application 108 is shown processing a write operation 271 and a read operation 281. As shown, the write operation 271 and the read operation 281 each interface with storage application 106, which in turn access block storage 136 and object storage 134, depending on the write or read flow. In an example write operation 271, the write operation begins by receiving a write command from the application 108, which is designed to write an amount of data to the storage resources of the cloud infrastructure. The write operation 271 shows the flow of block data from the application 108 directed to memory cache 220. Memory cache 220 is random access memory (RAM) that is utilized as part of the compute node in which the storage application 106 is operating on the cloud infrastructure.

Memory cache 220 is operating, in this example, as a shadow RAM, as the data that is written from the application 108 is fully stored in-memory cache 220, and also written to write cache 202 of block storage 136. In this configuration, the write operation also asked to write 272 the complete data to the write cache 202, which may be stored in one or more volumes 140. As mentioned above, block storage 136 may be defined to include different types of volumes, which may have different levels of performance. By way of example, the write cache 202 may be defined from solid-state drives that are slightly slower than solid-state drives that the fine a read cache 204, which utilizes volumes 142. In one configuration, the write cache 202 is smaller in size than the read cache 204, but the read cache 204 is much faster, so as to enable quicker read operations when the application 108 is reading from the block storage 136, volume(s) 140, in the form of read cache 204.

As mentioned above, memory cache 202 will hold the complete set of the data written by the application 108, and that data is transferred via path 273 a data reduction logic 240. Data reduction logic 240, in one embodiment, is configured to perform a compression of the data blocks written to memory cache 220. In another embodiment, data reduction logic 240 may perform a de-duplication operation on the data blocks written to memory cache 220, and in still other embodiments, a combination of compression and de-duplication may be performed by data reduction logic 240. Once data reduction is completed by data reduction logic 240, the reduced data blocks are transferred via 275 to coalescing logic 250. Coalescing logic 250 is configured to perform sequential organization of the data blocks, and collect a sufficient number of data blocks to assemble a data segment.

In one embodiment, a data segment is defined to have a size that is at least 1 MB or larger, and is optimized to make efficient utilization of the object storage 134. In one embodiment, the coalescing logic 250, organizes the data blocks in sequential order, and also ensures that the data segment is of sufficient size before being written to object storage 134. In some embodiments, the data segments can be as large as 4 MB or larger, but generally at least in the order of 1 MB to make the object storage writing process efficient.

The data reduction logic 240 and the coalescing logic 250, when processed by storage application 106, operates on the data blocks in-memory, e.g., RAM, before the data is transferred via 276 to the object storage 134 in the form of data segments 206. The data segments 206 are logically written to volumes 138 within object storage 134. As mentioned above, because the data being written to object storage 134 is of larger sizes, and sequential organization, the writing by the object storage 134 is more efficient. By way of example, if the physical media of object storage 134 includes hard disk drives, the writing heads of the hard disk drives will be more efficient in writing sequential sectors of data corresponding to the data segments 206 being written by the storage application 106.

Continuing with the writing operation 271 of FIG. 3, select data written to memory cache 220 is also separately written to the read cache 204 of the block storage 136. This is shown by flowline 274a, which is designated as a write of cache worthy data. As used herein, block data that is cache worthy is typically block data that is likely to be actively read by the application 108, or based on processing, is identified as related to a process or application that is ongoing or is associated with blocks of data that are considered hot, and would be read relatively soon by application 108 or other applications. Thus, the block data written to read cache 204 is considered to be cache worthy, and is thus stored in read cache 204 that is provisioned with faster solid-state drives, in association with volumes 142 of object storage 134.

With reference to the read operation 281, a flow is processed by read logic 260 of the storage application 106. The read logic 260 is configured to coordinate reading operations from either block storage 136 or object storage 134, in a manner that makes it efficient for returning requested data to the application 108. In one example, read logic 206 response to the read command provided by read operation 281, which request certain data blocks from storage. In a first attempt to serve the data rapidly, read logic will read from memory cache 220 to determine whether the requested data is still present in-memory cache 220. If it is determined that memory cache 220 does not have the requested data, the read logic will process a read 282 from the read cache 204 of the block storage 136.

If the data is present in the read cache 204, the data is served back by read logic 206 to application 108. If it is determined that the read cache 204 does not contain the requested data blocks, read logic 260 will read from object storage 134. Read logic 260, will then read the requested data blocks from object storage 134 via path 283 and return them to the application 108, servicing the read command. However, because the read cache 204 did not contain the requested data blocks for the read command, storage application 106 will cause the recently read data from object storage 134 to be written via path 283 back to the read cache 204. In this manner, if the data blocks are requested again by the application 108, the data blocks will be present in the read cache 204, which will be a quicker response for read logic 260 back to application 108.

From the above described read processing operations, it should be apparent that efficient utilization of storage resources of a cloud storage provider is enabled by storage application 106, which sits as a layer between the application 108 and the physical storage provisioned for application 108 by the cloud infrastructure. From the standpoint of writing operations, the storage application optimizes writing of data blocks directly to block storage 136 for efficient and quick storage of random I/O type writes. The storage application 106 also utilizes memory cache 220 to provide efficient acknowledgments back to the application 108, once the block data is written to memory cache 220. At the same time, data written to that memory cache 220 is also written to the write cache 202 of block storage 136.

Further optimized is the writing of cache worthy block data to the read cache 204, to enable fast read responses by read logic 260, in response to read commands issued by application 108. Still further, storage application 106 provides optimization to coalesce block data before writing to object storage 134. In one embodiment, data reduction operations associated with data reduction logic 240 are optional. However, the coalescing logic 250 is efficiently provided to ensure that data written to object storage 134 is in the form of data segments, which are sufficiently of larger size chunks to make efficient utilization of the type of storage infrastructure provided for object storage 134. Therefore, utilization of storage application 106, for facilitating writes and reads between application 108 and storage resources, define a cloud storage system 130a, which utilizes different types of storage resources, to functionally optimize the data storage access needs of application 108, which is also operating in a cloud processing node of the cloud service provider.

Figure 4:
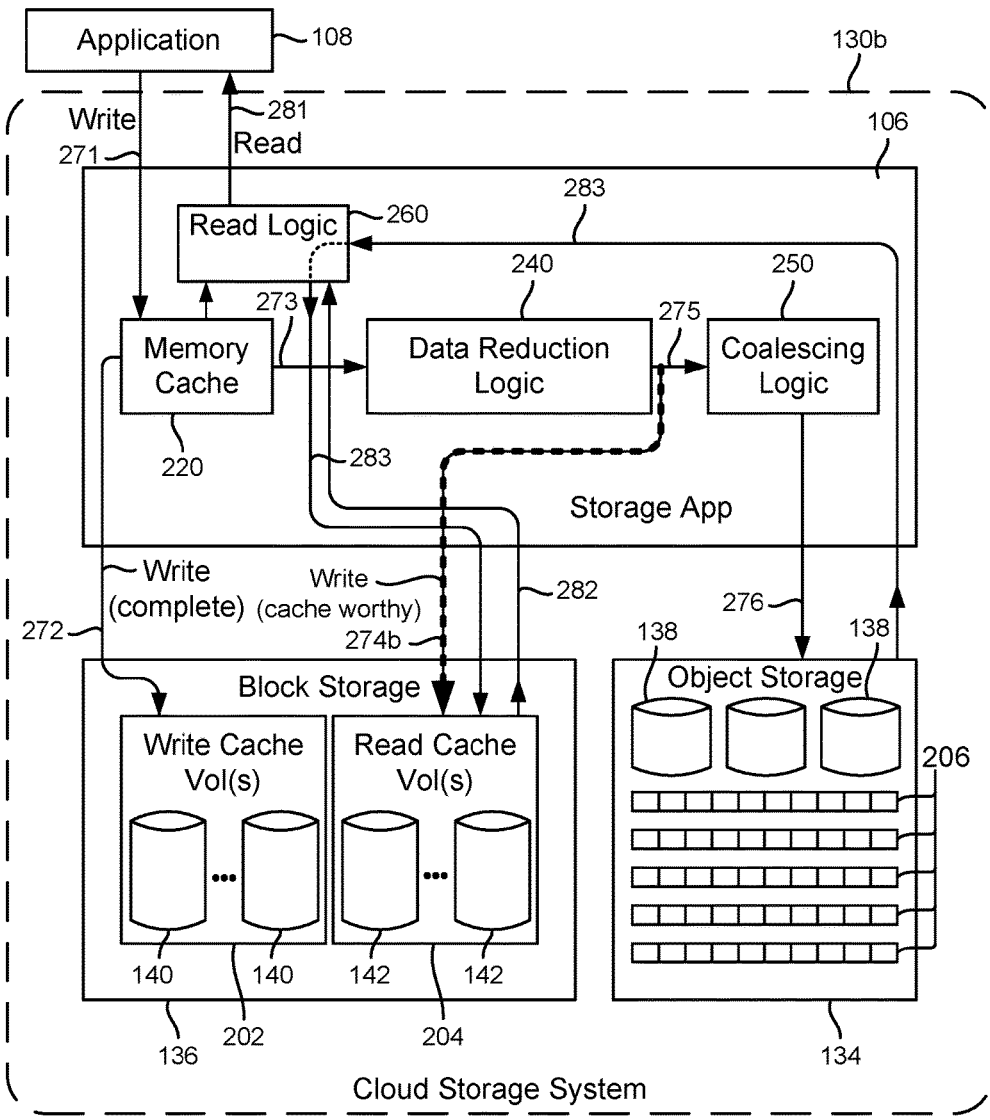
FIG. 4 illustrates another embodiment for optimizing the utilization of storage resources provisioned by a cloud storage provider.

FIG. 4 illustrates another embodiment for optimizing the utilization of storage resources provisioned by a cloud storage provider. In this example, application 108 also utilizes storage application 106, to facilitate the writing operations and reading operations to and from the block storage 136 and object storage 134. However, in this embodiment, the writing of cache worthy data via path 274b to the read cache 204 is delayed until after data reduction logic 240 operates on the block data. For example, by processing the selective write of cache worthy data until after data reduction logic 240 operates on the block data, allows for more efficient utilization of the block storage volumes 142 that are designated for the read cache 204.

By way of example, if the data reduction logic 240 implements a compression or de-duplication process, or both, the data being written to the read cache 204 will be reduced, therefore making more efficient utilization of the allotted storage capacity provided by block storage 136, and in particular the read cache 204 of block storage 136. As mentioned above, it is possible to eliminate data reduction logic 240, and in which case the cache worthy data would be written from memory cache 220 via path 273. In either case, block storage 136 is provided and designed to receive data blocks from application 108 or other applications 108, which may be writing random I/O or nonrandom I/O to the storage allocated to it by the cloud storage provider. Storage application 106 is therefore configured, as a layer between the application 108 or other applications 108, and the different types of storage resources that may be provision for the applications, or a specific customer that is running certain applications.

Again, the coalescing logic 250, is configured to assemble blocks of data, in one embodiment, in a sequential ordered manner so that the storage hardware of the object storage 134 can more efficiently write these larger chunks of data. The cloud storage system 130b, therefore defines a layer that allows for efficient handling of reads and writes between applications in a cloud system that are accessing storage in the cloud system. The efficient utilization, as mentioned above, will act to reduce processing power by the hardware associated with the storage resources, and also optimize the utilization of those storage resources based on their intended use and/or physical construction. An additional savings to customers that utilize storage application 106 in conjunction with their use of provisioned cloud storage, is the ability to reduce the utilization of the storage resources in ways that are not intended and may end up costing more in money charged to the customer. By way of example, if the storage resources are not utilized in an efficient manner, customers may be utilizing the storage resources in ways that the storage service provider will charge more per amount of data stored or accessed.

As such, the embodiments described herein provide optimizations in various levels, including technology, storage utilization, power savings, cost savings, and flexibility and configuration. As mentioned above, the storage application 106 may be configured based on changes in the data resource needs a certain applications, from time to time, based on learned usage patterns, based on analysis of uses patterns of other systems, and the like. More information regarding these types of analytics are described below with reference to FIG. 11.

Figure 5A:
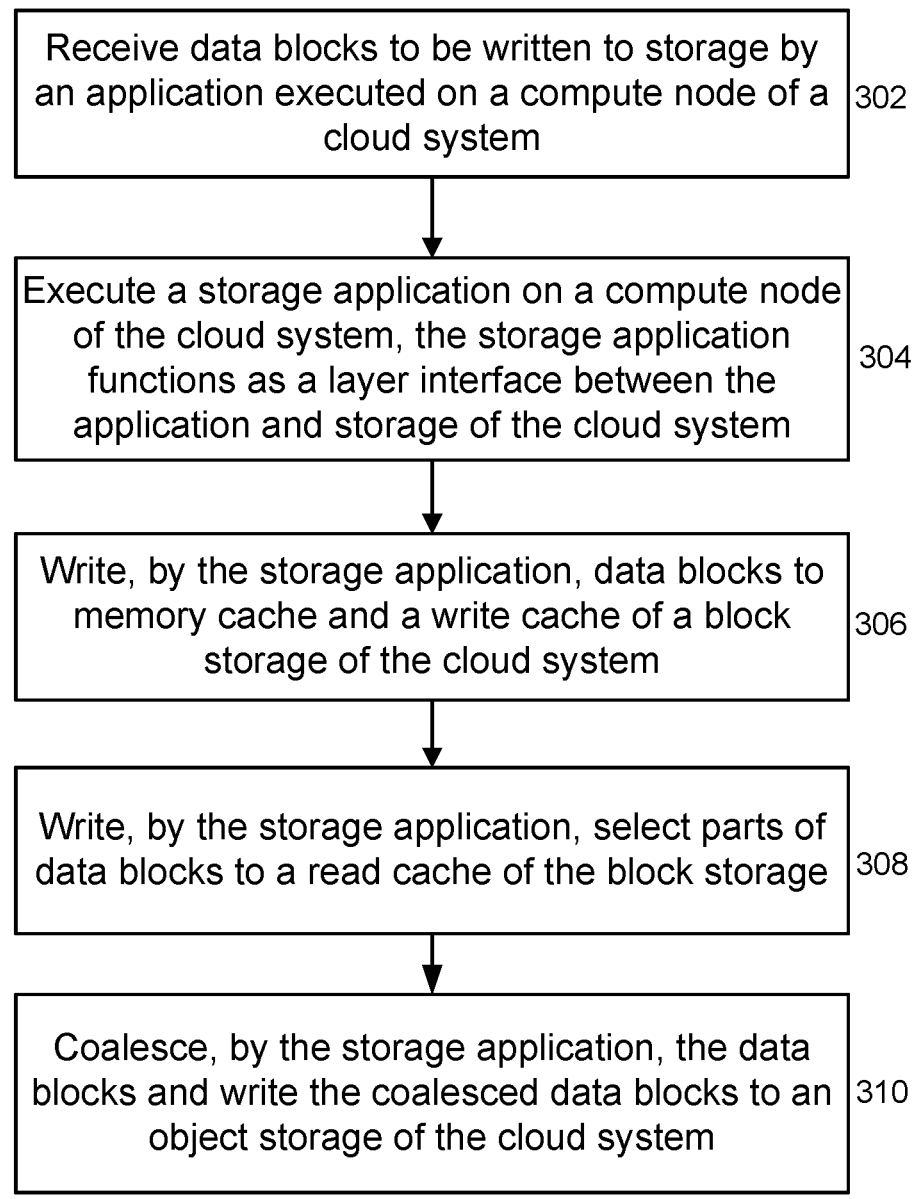
FIG. 5A illustrates an example process for executing operations provided by storage application, in accordance with one embodiment.

FIG. 5A illustrates an example process for executing operations provided by storage application 106, in accordance with one embodiment. In operation 302, data blocks are received to be written to storage by an application executed on a compute node of a cloud system. The application may, for example, send a write command or multiple write commands to the storage provided by the cloud system. In operation 304, a storage application is executed on a compute node of the cloud system. The storage application functions as a layer interface between the application and the storage of the cloud system. As mentioned above, writes and reads provided from and to an application 108 are handled by storage application 106. Storage application 106 provides the functional logic for determining what type of storage will be used for specific processes of the writing and reading. In operation 306, data blocks to be written are handled by the storage application, and are written to memory cache and also to write cache of a block storage provided by the cloud system.

In operation 308, are written to a read cache of the block storage. In one embodiment, the select parts of data blocks, correspond to cache worthy data. Cache worthy data is data that is most likely to be accessed frequently or is likely to be accessed soon in the future, and is therefore stored in read cache of the block storage. In operation 310, the data blocks being written are coalesced by the storage application in order to generate coalesced data blocks and then are then written to object storage of the cloud system. As described above, the operation of coalescing data blocks includes arranging data blocks in sequential order, and then writing the coalesced data blocks as a data segment to the object storage.

As mentioned above, the object storage is, in one embodiment, optimized to write larger chunks of data, e.g., greater than 1 MB, and therefore the coalescing function organizes segment data in a manner that is most efficient for writing to object storage. In other embodiments, the segment data is processed to generate sizes that are 4 MB or larger. In some cases, remaining data that cannot generate full segment data may be smaller than 1 MB. In contrast, data blocks may be in the neighborhood of about 4 kB, and in some cases less than 100 kB.

These mentioned sizes for segment data and block data are only provided by way of example, and should not limit implementations that use different size blocks or segment data. It is believed, however, that the generation of segment data for writing to object storage improves the utilization of object storage. And, segment data is, in one embodiment, defined from two or more blocks of data, which may or may not be compressed.

Figure 5B:
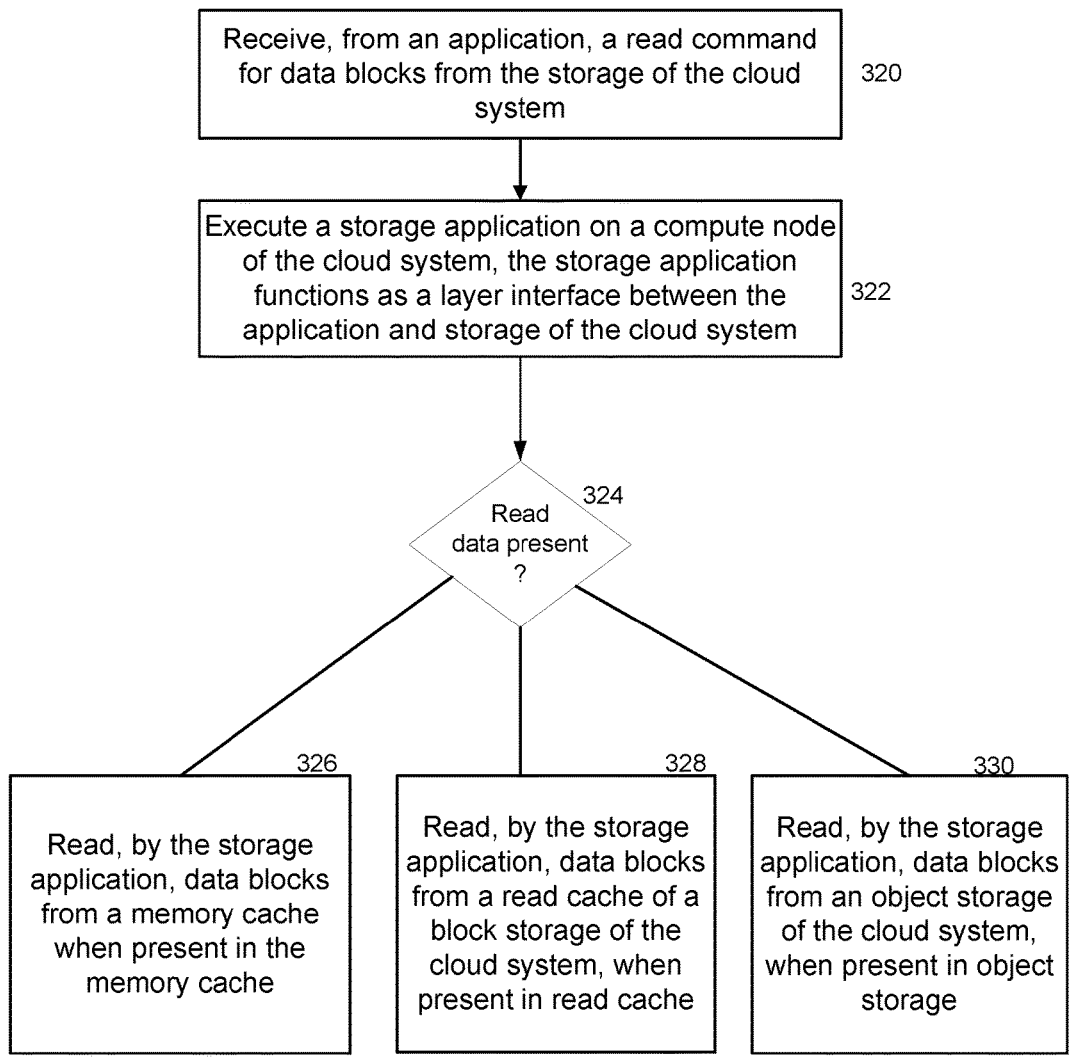
FIG. 5B illustrates an example flow diagram of a read operation, handled by logic of the storage application, in accordance with one embodiment.

FIG. 5B illustrates an example flow diagram of a read operation, handled by logic of the storage application 106, in accordance with one embodiment. In operation 320, a read command is received from an application. The read command is for data blocks from the storage of the cloud system. In operation 322, a storage application is executed on a compute node of the cloud system. The storage application functions as a layer interface between the application and the storage of the cloud system. In operation 324, logic is executed to determine the location of the data being requested in the read command. First, the read attempt is made to the memory cache in operation 326, which is RAM provided to the compute node in which the storage application 106 is executing.

As described above, the memory cache 220, may contain the data blocks requested by the read command. If the memory cache does not have the data being requested, the operation 328 is executed, where an attempt to read the data blocks is made to a read cache of the block storage provided by the cloud system. If the data is present in read cache, the data is served back to the application. If the data is not present in the read cache, the read operation proceeds to read from the object storage. If the data is found in the object storage, the data is returned back to the application, and that same data is written back to the read cache. The data is written back to the read cache in order to have it ready for a subsequent read, since that data may be accessed more frequently. In this manner, subsequent reads may read the data quicker from the read cache, then requiring access from object storage.

Part II: Storage Applications Executed in a Cloud Compute Node that Use Sub-Set Logic to Identify and Handle Data Block Writes to an Read Cache-on-Write Buffer FIG. 6B illustrates a block diagram of a cloud storage system 130d, in accordance with one embodiment. This embodiment shows operations performed by storage application 306, which is executed on a compute node of a cloud infrastructure, provisioned by a cloud service provider. For a write 371 operation received from application 108, the storage application 306 will process sub-set logic 330, which is configured to control selection of a sub-set of write buffer data being written for storage to a read cache-on-write buffer 340. In addition, sub-set logic 330 will function as a pass-through to enable data blocks to be written to write cache 202, via path 372. In one embodiment, the sub-set logic 330 may be configured to write all of the data blocks received from one or more write operations from the application 108 directly to read cache-on-write buffer 340, in addition to writing all of the data blocks to the write cache 202.

The read cache-on-write buffer 340 is configured to store the data blocks and/or metadata associated with particular applications that have been identified as having a threshold of writing activity. For example, if a certain application 108 is writing data blocks consistently, and another certain application 108 is not writing data blocks frequently enough, the data blocks from the infrequently writing application 108 may be evicted from the read cache-on-write buffer 340. In some embodiments, the read cache-on-write buffer 340 may be configured to receive only certain data blocks from sub-set logic 330, which may relate to certain applications 108. As illustrated in in FIG. 6A, application 108 is shown to be a single application. In operation, the cloud storage system 130d may be servicing many applications 108 at the same time, and thus the write operation 371 may be associated with one or more different applications 108.

In this manner, depending on the application performing the write operations, the sub-set logic 330 can select certain ones of the applications 108 so that their data blocks are written to read cache-on-write buffer 340, while data blocks not written to the read cache-on-write buffer 340 as determined by sub-set logic 330, will simply be written to the write cache 202. In one embodiment, the sub-set logic 330 operates to identify certain applications 108 that may be frequently writing data blocks, and those applications can be identified for their storage of data blocks to the read cache-on-write buffer 340. If certain data blocks are stored in the read cache-on-write buffer 340, which are not associated with applications having a threshold level of writes, then those data blocks can be evicted from the read cache-on-write buffer 340. As mentioned above, the sub-set logic 330 has already written all of the data blocks to the write cache 202 (i.e., write buffer), so if the eviction from the read cache-on-write buffer 340 occurs, it will not delete the data completely.

In one embodiment, the read cache-on-write buffer 340 is managed to store a sub-set of the data blocks and/or metadata being written by one or more applications. The coalescing logic 250, in one embodiment, is configured to select certain data blocks from the read cache-on-write buffer 344 for coalescing. The selection of data blocks from the read cache-on-write buffer 340 can be to construct data segments (i.e., two or more data blocks). As mentioned above, the data segments can include data blocks that are arranged sequentially, before they are written to object storage 134. In one embodiment, the read cache-on-write buffer 340 can be holding a plurality of data blocks associated with one or more applications 108. If the data segments are determined to be ready for coalescing by coalescing logic 250, the data segments present in the read cache-on-write buffer 340 may not be complete to assemble a particular data segment. For instance, it may be necessary to read from the write cache 202 particular data blocks in order to assemble a data segment for coalescing by coalescing logic 250.

For instance, data segments coalesced by coalescing logic 250 can be obtained from read cache-on-write buffer 340 as well as write cache 202 via path 374. In one embodiment, data blocks necessary for generating a data segment may have been evicted from the read cache-on-write buffer 340, and construction of the data segments requiring certain ones of the data blocks that have been evicted would be obtained from the write cache 202. In one embodiment, it may be necessary to obtain data blocks from the write cache 202, since the read cache-on-write buffer 340 will only hold a sub-set of all of the data blocks written by applications 108, and where such data blocks are written via path 372 to the write cache 202. Broadly speaking, the read cache-on-write buffer 340, in one embodiment, is configured to hold a sub-set of write buffer data, as opposed to being a shadow the data blocks being written to the write cache 202.

As mentioned above, the sub-set logic 330 may be configured to store only a sub-set of the data blocks to the read cache-on-write buffer 340, based on the applications 108 that are writing data blocks, and wherein all data blocks are written to the write cache 202 via path 372. The read cache-on-write buffer 340 provides for an efficient selection of a sub-set of write buffer data, which can be coalesced and then written to object storage 134 by coalescing logic 250. In one embodiment, all data that is written to the write cache 202 will eventually be coalesced by coalescing logic 250, when obtained from the read cache-on-write buffer 340 alone, or a combination of both the read cache-on-write buffer 340 and the write cache 202.

In one embodiment, the storage application 306 is also configured to write data blocks to the read cache 204, via path 378a, for data blocks that are considered to be cache worthy. Data blocks that are considered to be cache worthy are those that are likely to be read frequently, are associated with active application reads, or are associated with re-temperatures that indicate their likelihood of being read more frequently. By writing cache worthy block data to the read cache 204, read operations are optimized by the storage application 306.

Figure 6A:
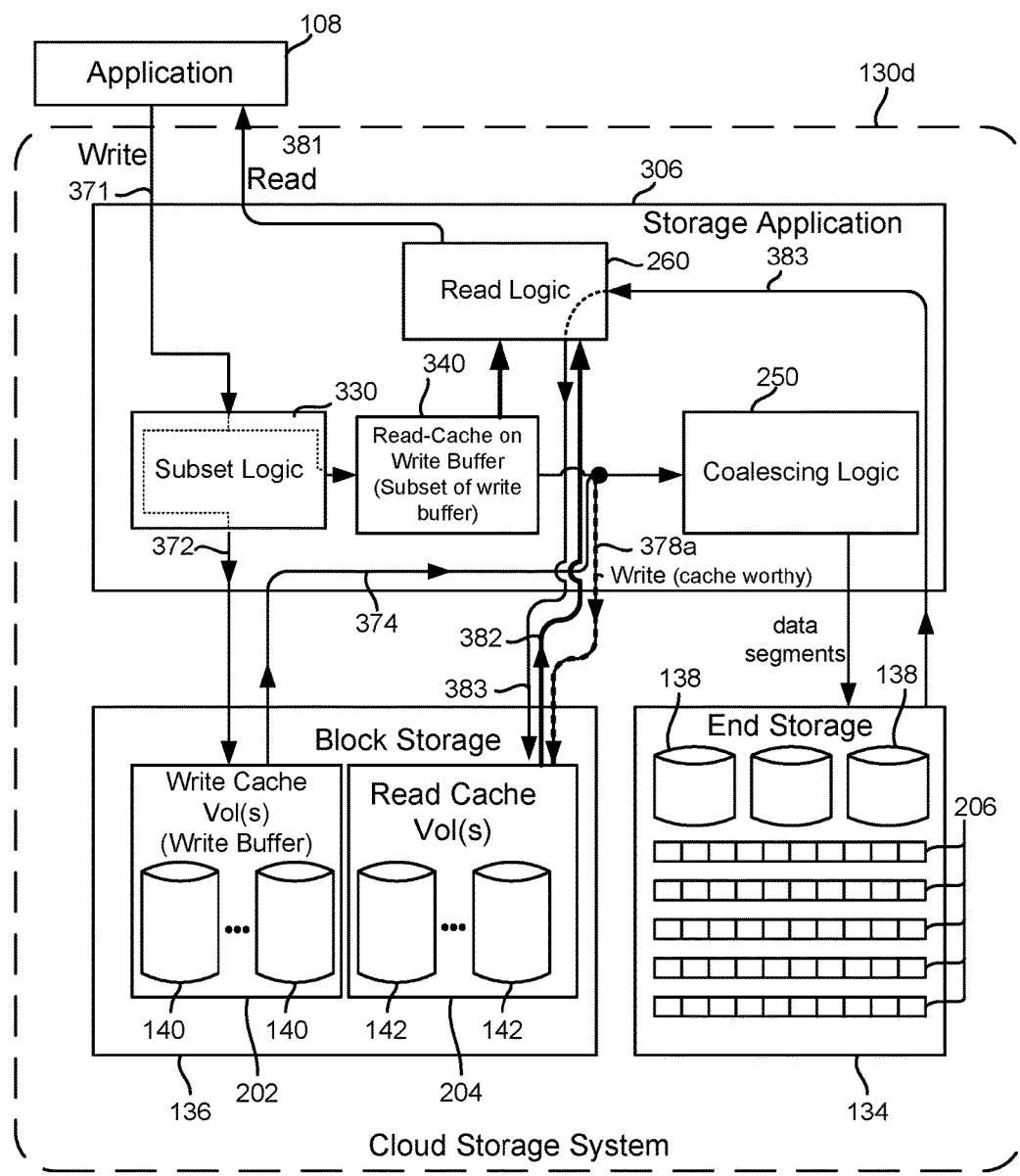
FIG. 6A illustrates a block diagram of a cloud storage system, in accordance with one embodiment.
Figure 6B:
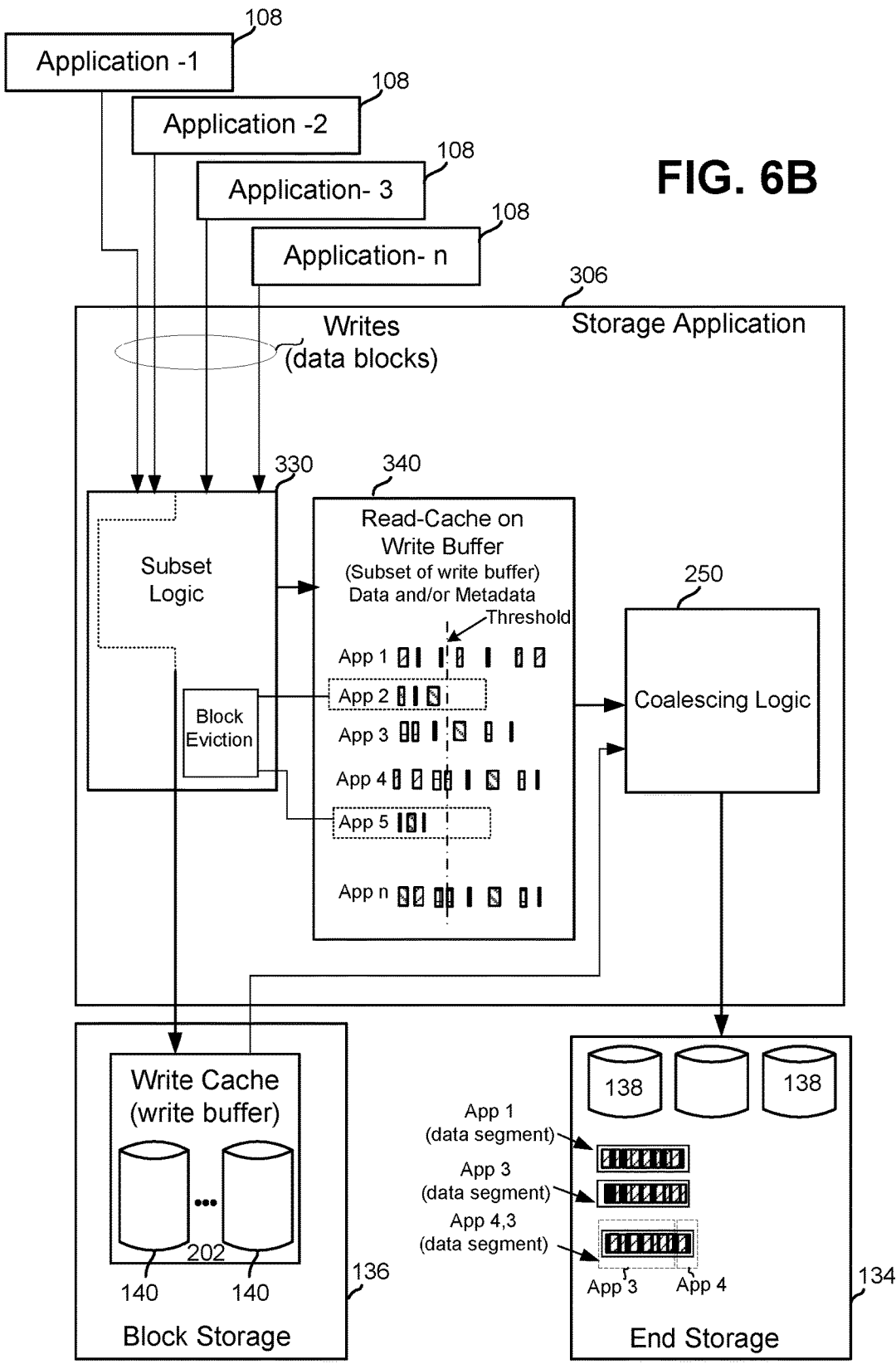
FIG. 6B illustrates an example where any number of applications can be accessing storage of the cloud infrastructure, and storage application handles the access operations to the storage resources, such as block storage and object storage.

Continuing with the description of FIG. 6A, a read operation 381 can be requested by application 108. As mentioned above, application 108 is represented as a single application, but it is possible to have many applications 108 utilizing cloud storage system 130d. As a result, storage application 306 can be configured to process storage writes and storage reads, and other storage commands as requested by one or more applications 108. In the example of read operation 381, read logic 260 of storage application 306 is configured to handle processing of the read command or operation. Initially, the storage application 306 will check that read cache-on-write buffer 340 to determine if the data blocks requested for the read are present in the read cache-on-write buffer 340.

The read cache-on-write buffer 340 operates as volatile memory, e.g. random access memory, and therefore if data blocks requested for the read 381 are present in the read cache-on-write buffer 340, the response will be substantially accelerated to return data blocks to the application 108. If the requested data blocks are not present in the read cache-on-write buffer 340, the read logic 260 will perform a read operation 382 from the read cache 204 of block storage 136. If the requested data blocks are present in the read cache 204, the data blocks are returned to the application 108. If it is determined that the read cache 204 does not contain the requested data blocks, the read logic 260 will request a read operation 383 from object storage 134. As shown, object storage 134 will contain a plurality of data segments 206, which are stored in associated volumes 138.

Read logic 260 will then request the data blocks that are present in the written data segments 206 and return them to the application 108 to satisfy the read request 381. In one embodiment, once the data blocks are read from the object storage 134, those data blocks are also written to the read cache 204 by the read logic 260. In one embodiment, writing back to read cache 204 occurs if the data is defined to be cache worthy. If written to read cache 204, the data blocks that were accessed can be easily accessed again from read cache 204. In one embodiment, because the data blocks have been accessed from object storage 134, those data blocks are considered hot or likely to be read again. In one embodiment, these data blocks are cache worthy, and therefore they are stored in the read cache 204 after they have been accessed from object storage 134.

FIG. 6C illustrates an example where any number of applications 108 can be accessing storage of the cloud infrastructure, and storage application 306 handles the access operations to the storage resources, such as block storage 136 and object storage 134. In this example, sub-set logic 330 handles the receipt of write operations of data blocks from the various applications 108 that are utilizing the storage application 306 to access the storage of the cloud infrastructure. As shown, sub-set logic 330 is configured to write all of the data blocks to the block storage 136, such that the write cache 202 contains all written data blocks. In one embodiment, the sub-set logic 330 is configured to write data blocks to the read cache-on-write buffer 340, as well as writing them to the write cache 202.

In one configuration, a threshold analysis is performed to determine whether certain ones of the applications 108 have written a threshold amount of data blocks to the read cache-on-write buffer 340. For example, if certain applications are writing data blocks too infrequently, they will not meet a threshold amount of writing activity to remain in the read cache-on-write buffer 340. As shown, application 2 and application 5 have written data blocks to the read cache-on-write buffer 340, but application 2 and application 5 have not met the threshold required for remaining in the read cache-on-write buffer 340. Accordingly, the eviction of the data blocks associated with application 2 and application 5 will be evicted. In one embodiment, sub-set logic 330 includes block eviction logic, which is configured to evict data blocks from the read cache-on-write buffer 340 that have not met the threshold.

The threshold can be defined by the number of data blocks written over a period of time, or lack of data blocks written over a period of time. If certain applications are more active, such as applications 1, 3, 4, and n, the data blocks associated with those applications will remain in the read cache-on-write buffer 340 for a sufficient period of time until they can be identified for coalescing by coalescing logic 250. For example, coalescing logic 250 can identify data blocks from application 1 and application 3, which are then coalesced to create a data segment, which is written to object storage 134. In one embodiment, coalesced data blocks that are written as data segments by coalescing logic 250 obtain data blocks from the read cache-on-write buffer 340, and certain blocks from write cache 202, in order to create a data segment having ordered data blocks for a specific application. For instance, it may be possible that certain data blocks for certain applications were evicted for lack of activity, but subsequently that application became more active.

At that point, coalescing logic 250 would be ready to construct data segments for that application, but certain data blocks would not be present in the read cache-on-write buffer 340. For this reason, coalescing logic 250 is config- ured to read certain data blocks from write cache 202 in order to construct the data segments that are written to object storage 134. In an alternative embodiment, it is possible to write data segments that are composed of data blocks from two or more applications. In object storage 134, it is shown that a data segment can be constructed from data blocks associated with applications 4 and 3. In some embodiments, data blocks can be constructed from more than two applications. In further embodiments, it should be understood that the data segments can have varying sizes. As mentioned above, typically data segments may have a size that is at least greater than 1 MB. If data blocks are 4 KB, then the data segment may have 250 data blocks. As mentioned above, reference to data segment sizes and data block sizes is only by way of example, to provide an example reference and understanding.

Figure 7A:
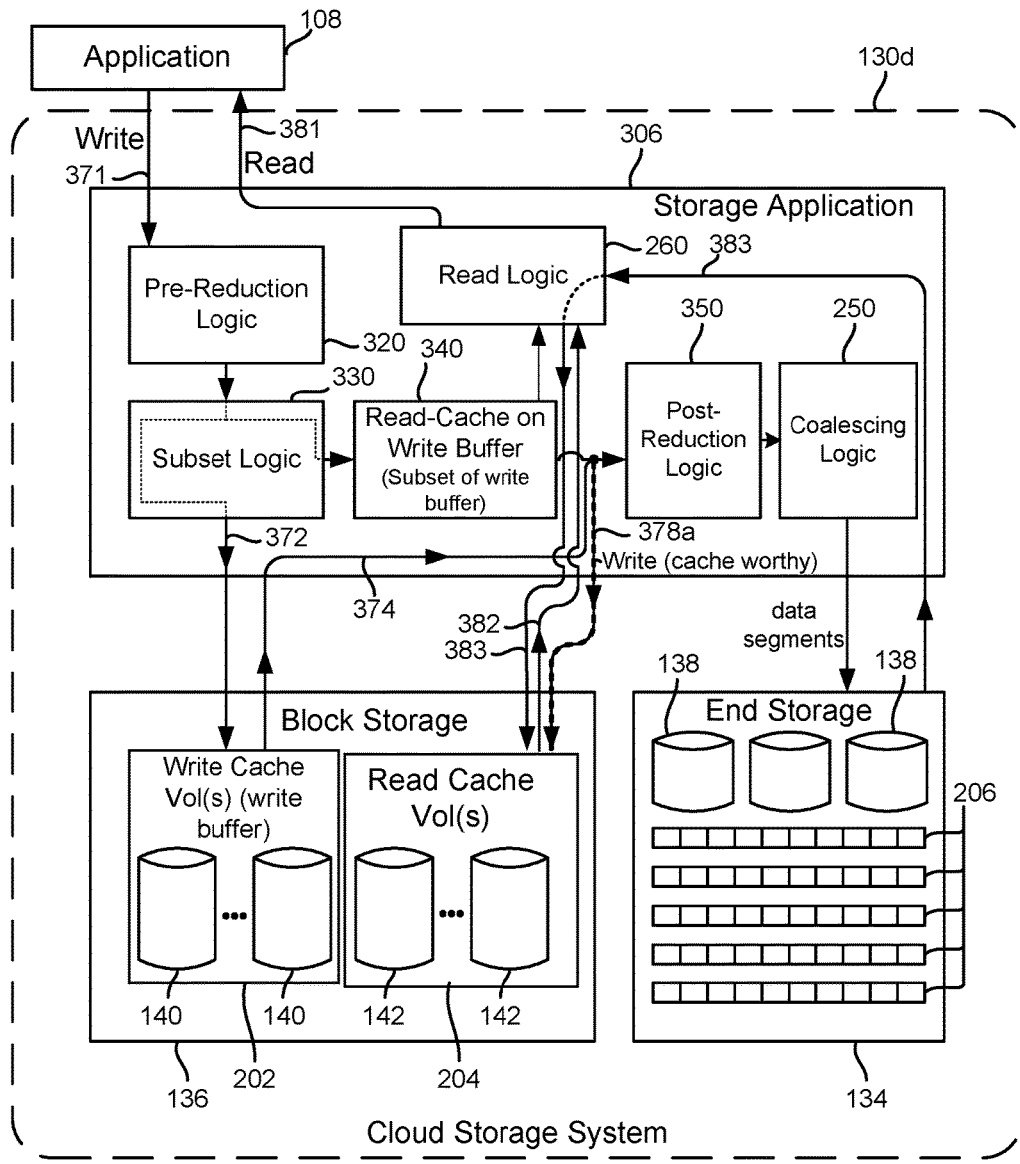
FIGS. 7A-7B illustrate examples of operating a storage application to service storage access, in accordance with some embodiments.

FIG. 7A illustrates a block diagram of another embodiment of storage application 306, which operates to provide cloud storage system 130d. In this embodiment, the storage application 306 is configured with pre-reduction logic 320 as well as post-reduction logic 350. Pre-reduction logic 320 is configured to perform reduction operations on data blocks being written by application 108, before the data is handled by sub-set logic 330 or written to the write cache 202. Pre-reduction logic 320, in one embodiment, may include performing de-duplication operations. In other embodiments, pre-reduction logic 320 may include performing compression operations on the data blocks being written.

In some embodiments, pre-reduction logic 320 can be activated at different levels based on the activity of the storage application 306. For instance, if the storage application 306 is very active, e.g., providing read and write operations for one or more applications 108, the pre-reduction logic 320 may do reduction operations on the data blocks before being written to the write cache 202 and the read cache-on-write buffer 340. By performing the reduction operations in pre-reduction logic 320, before subsequent handling by other logic in the storage application 306, subsequent handling of the data blocks will be more efficient, given the high load of the storage application 306. If the storage application 306 has a lower load, or relatively low load, the data blocks being written by applications 108 can be provided to sub-set logic 330 and written to the write cache 202 without processing by pre-reduction logic 320.

The data blocks are then handled by the sub-set logic 330 and the read cache-on-write buffer 340 as described above with reference to FIGS. 6A and 6B. As shown, a post-reduction logic 350 is provided, which can process reduction operations on the data blocks just before being processed for coalescing by coalescing logic 250. Similar to the type of reduction operations performed by pre-reduction logic 320, the reduction operations performed or performable by the post-reduction logic 350 can include de-duplication, compression, garbage collection, and the like. Therefore, before writing data segments 2062 the object storage 134, coalescing logic 250 will obtain compressed data blocks from the post-reduction logic 350.

In some embodiments, it is possible to perform some data reduction by the pre-reduction logic 320 and other data reduction by the post-reduction logic 350. By way of example, some data blocks can be processed for pre-reduction, while other data blocks can be processed during post-reduction. Generally speaking, the reduction operations can be performed pre-reduction and post-reduction depending on load, which defines a load based staging of reduction by the storage application 306. In alternative embodiments, reduction operations may not be performed by storage application 306.

Figure 7B:
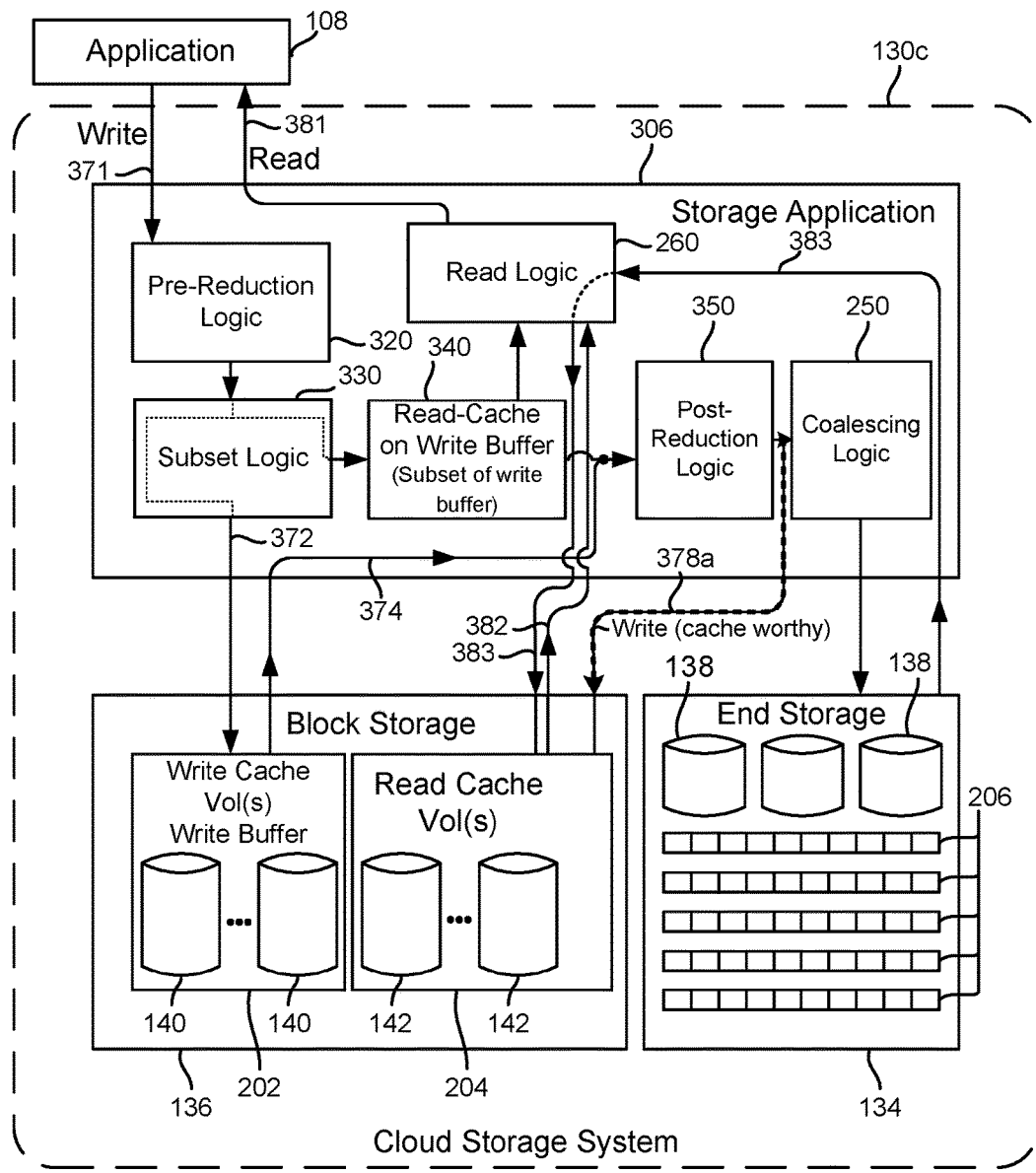

In the embodiment of FIG. 7A, the cache worthy data blocks are written to the read cache 204 after being obtained from the read cache-on-write buffer 340 and/or the write cache 202. This embodiment will perform the cache worthy writing of data blocks to the read cache 204 before post-reduction logic 350 operates on the data blocks that will be coalesced by coalescing logic 250. In the embodiment of FIG. 7B, the cache worthy data blocks can be written to the read cache 204 after processing by the post-reduction logic 350.

Figure 8A:
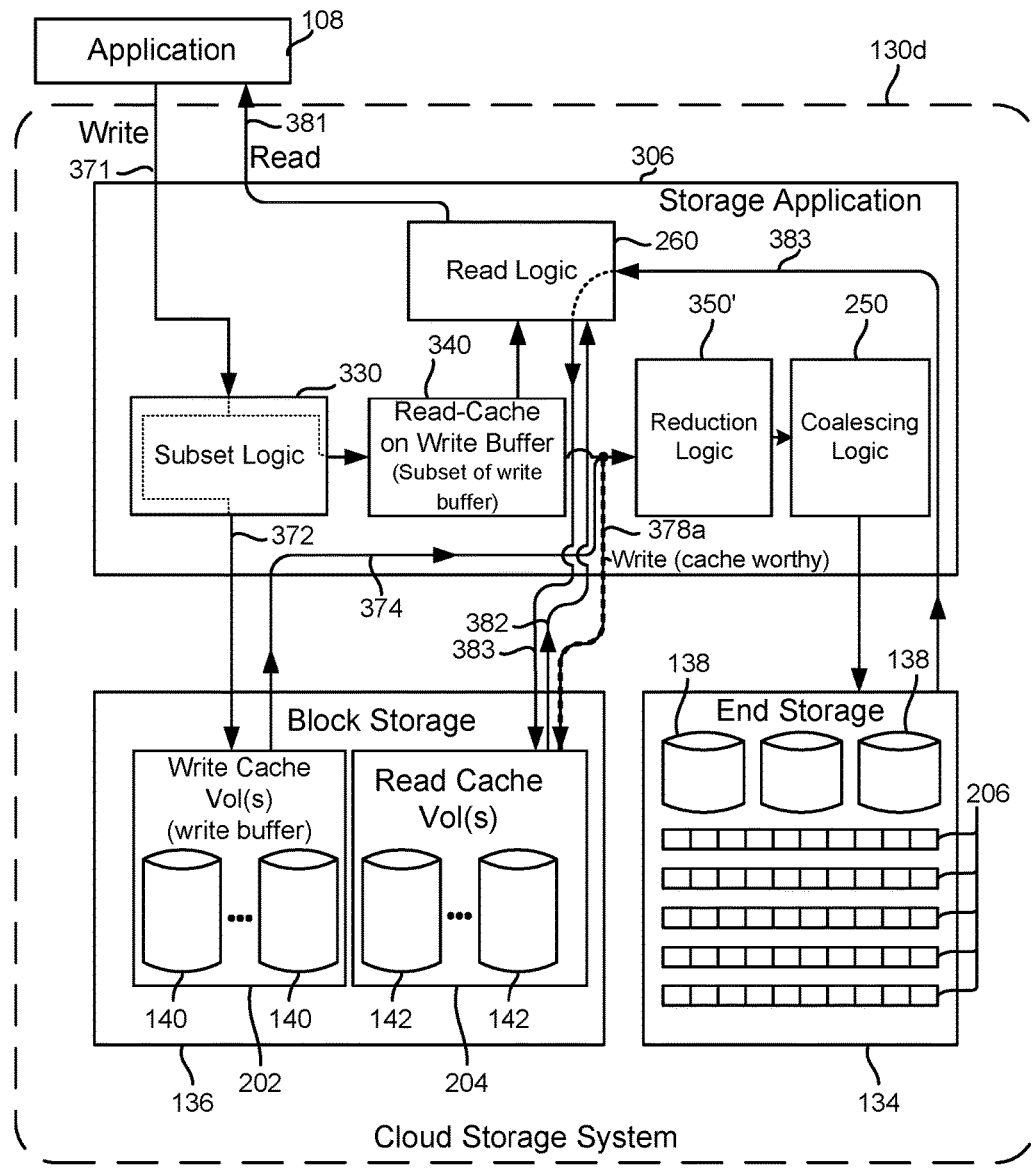
FIG. 8A illustrates an embodiment where storage application includes reduction logic, which is configured to perform reduction operations on data blocks obtained from the read cache-on-write buffer, or from both the read cache-on-write buffer and the write cache before being sent to or obtained by coalescing logic for draining to end storage.

FIG. 8A illustrates an embodiment where storage application 306 includes reduction logic 350', which is configured to perform reduction operations on data blocks obtained from the read cache-on-write buffer 340, or from both the read cache-on-write buffer 340 and the write cache 202 before being sent to coalescing logic 250. In one embodiment, the reduction operations performed by reduction logic 350' may include compression operations, which reduce the size of the data blocks that will be coalesced by coalescing logic 250. In other embodiments, the reduction logic 350' may be configured to perform de-duplication for the data blocks being selected for coalescing by the coalescing logic 250.

In other embodiments, the reduction logic 350' can be configured to perform garbage collection on data blocks before they are coalesced by coalescing logic 250 and then stored to the object storage 134. In this embodiment, the cache worthy data blocks are written to the read cache 204 before the reduction operations performed by reduction logic 350'. Of course, other embodiments can also perform the writing of cache worthy data blocks after the reduction logic 350' has completed the reduction operations.

Figure 8B:
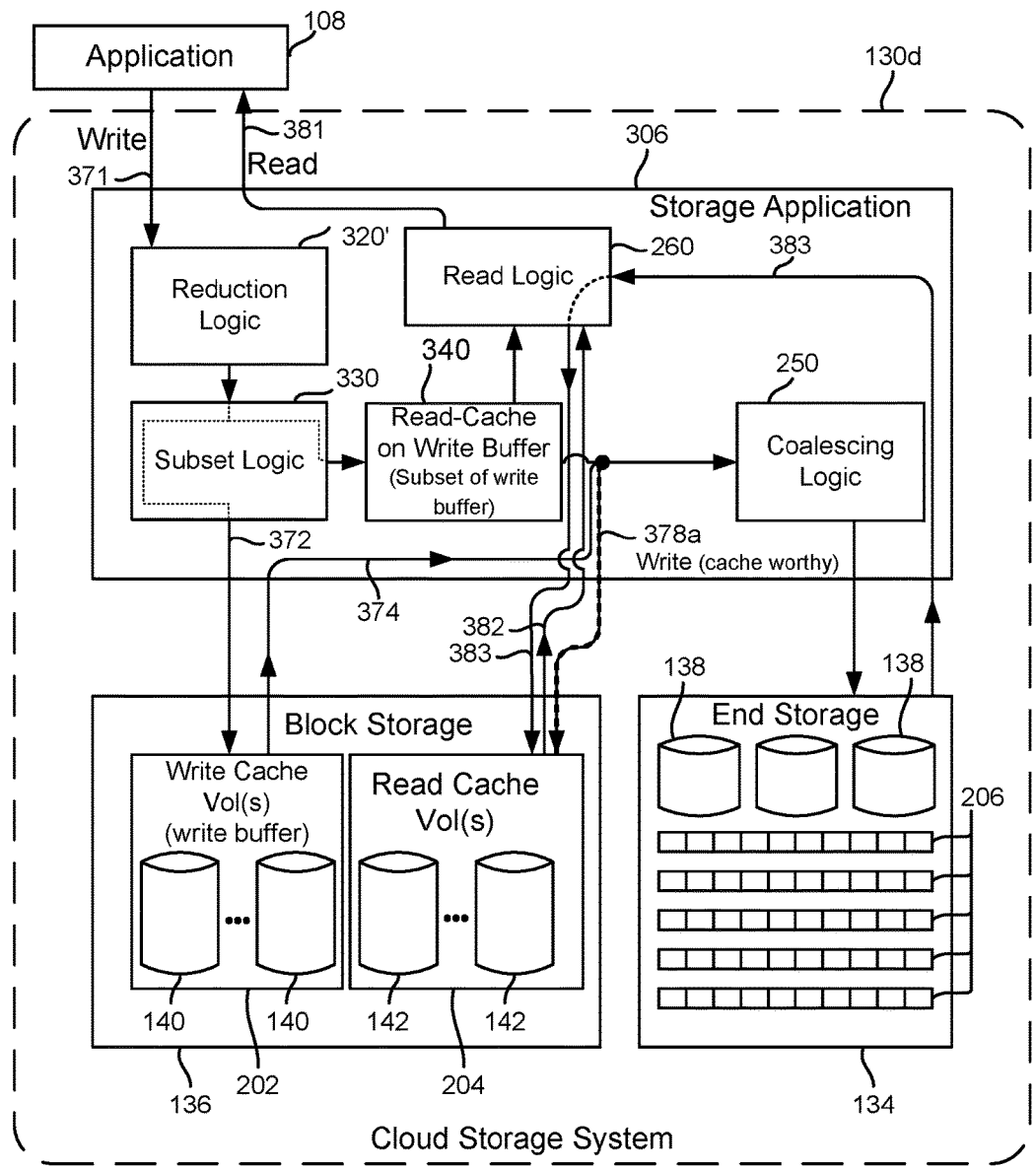
FIG. 8B illustrates another embodiment of the storage application, which is configured to perform reduction operations via reduction logic, for data blocks receive for writing from applications.

FIG. 8B illustrates another embodiment of the storage application 306, which is configured to perform reduction operations via reduction logic 320', for data blocks receive for writing from applications 108. In this example, the reduction logic 320' performs initial reduction operations before the data blocks are handled by other logical components of the storage application 306 and before the data blocks are written to either the block storage 136 or the object storage 134. Reduction logic 320' can perform any one of compression operations, de-duplication operations, garbage collection, or combinations thereof. Storage application 306, in this configuration, will not include post-reduction logic, as the reduction operations are performed at the front and of receiving data blocks for writing.

Figure 9A:
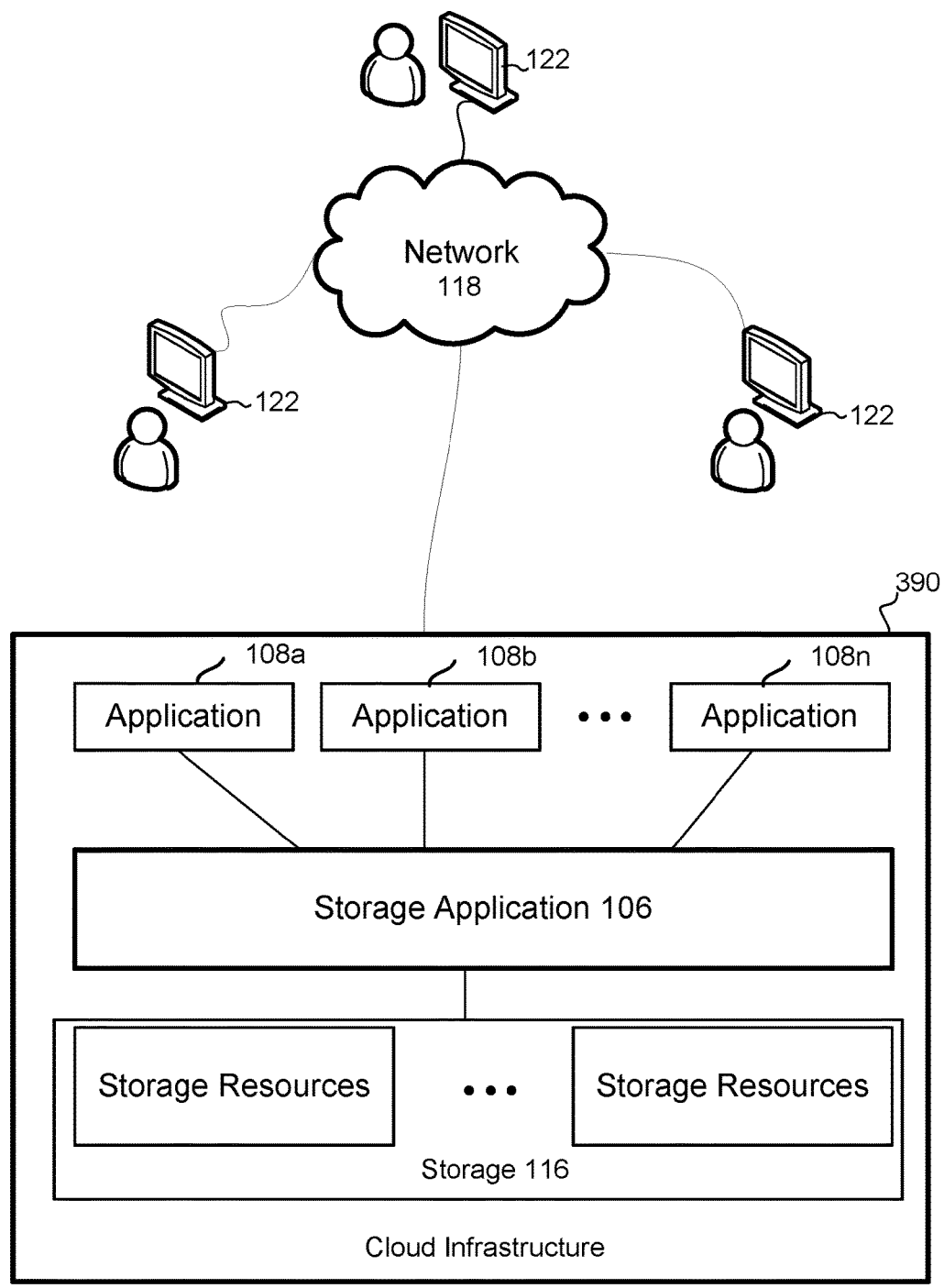
FIG. 9A illustrates a block diagram of cloud infrastructure, including storage application that services storage access for applications.

FIG. 9A illustrates a block diagram of cloud infrastructure 390, including storage application 106 that services storage access for applications. As shown, the storage application 106 and the applications 108a-108n can be executed on compute nodes of the cloud infrastructure 390. The storage resources, which can include block storage 136, object storage 134, and other types of storage, can be provided by the cloud infrastructure 390 in the form of storage 116. As described above, the storage application 106 is configured as a servicing entity or later, that provides more efficient access of storage 116 to the various applications 108. As mentioned above, the applications 108a-108n can be of different types. In some embodiments, the applications 108 can be processed for the same entity or customer, and in other embodiments, the applications 108 can each be associated with different customers or entities.

By way of example, application 108a can be executed for a video streaming company, which provides video streaming to its customers. Application 108b, may be a database application, which may be executed for a banking entity or customer of the cloud infrastructure 390. In other embodiments, applications 108a and 108b may simply execute different business applications for the same customer, such as a technology company. Having the storage application 106 executing as the intermediate layer between the storage 116 and the applications 108, therefore provides for the efficient utilization of storage resources.

Although the cloud infrastructure 390 is illustrated as a single block diagram of storage 116, it should be understood that the cloud infrastructure 390 may be defined by multiple data centers, and network interconnections. In such a configuration, storage application 106 may be executed in multiple data centers, such that applications 108 requiring storage access in the various data centers, can be provided with efficient utilization of storage resources.

Figure 9B:
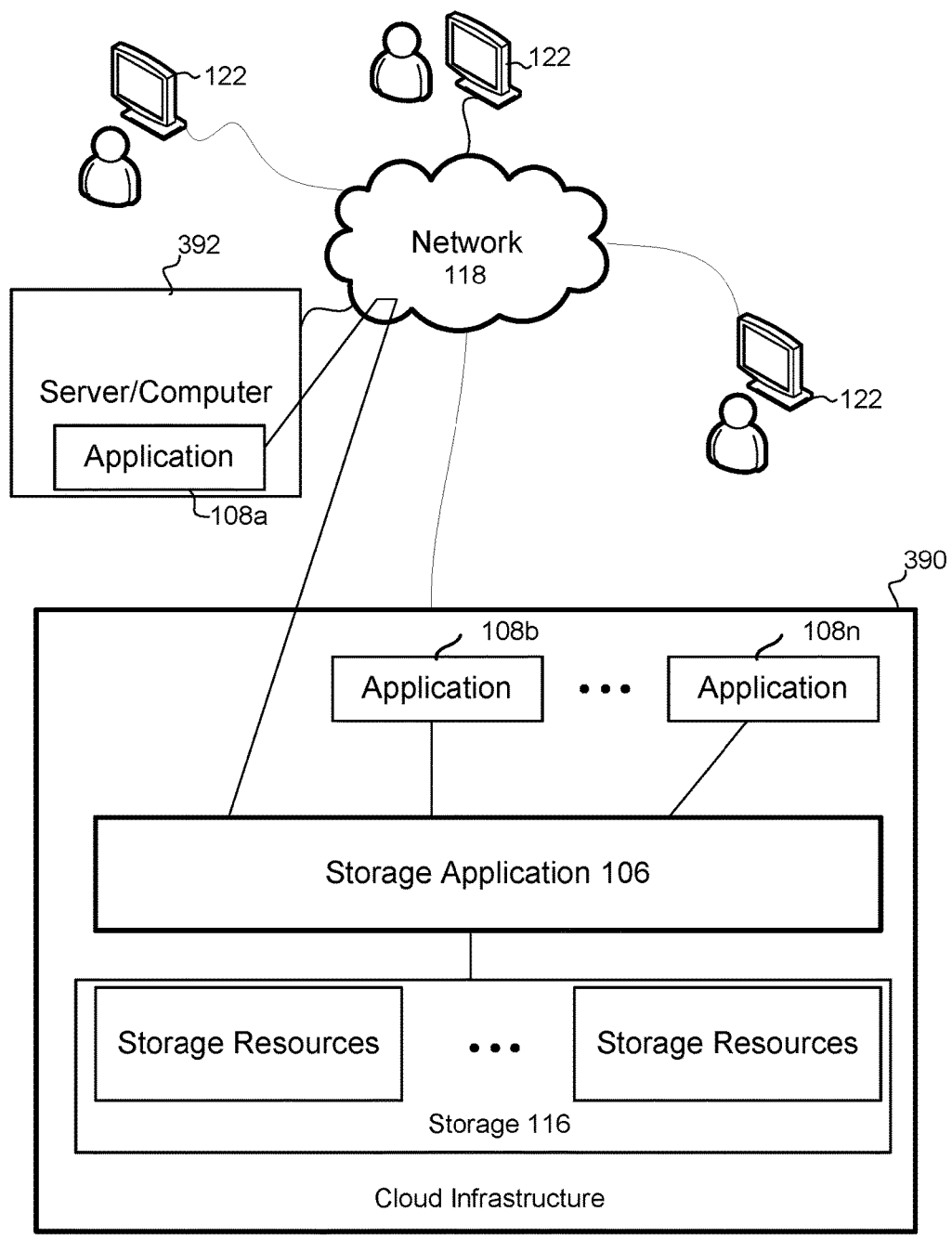
FIG. 9B illustrates an embodiment where storage application is executed on the cloud infrastructure, but one or more of the applications utilizing storage application can be executed outside of the cloud infrastructure.

FIG. 9B illustrates an embodiment where storage application 106 is executed on the cloud infrastructure 390, but one or more of the applications utilizing storage application 106 can be executed outside of the cloud infrastructure 390. As shown, a server or computer 392 may be connected to the network 118, and can be provided for executing application 108a. In one embodiment, the programming interface, connection, or login credential is provided for application 108a, which directs its storage access commands through storage application 106. For example, storage application 106 can be providing storage access operations to other applications, such as applications 108b-108n. However, another application or multiple other applications, such as application 108a, can be executed outside of the cloud infrastructure, yet still is provided with access to the storage application 106 for facilitating access to storage 116.

Figure 9C:
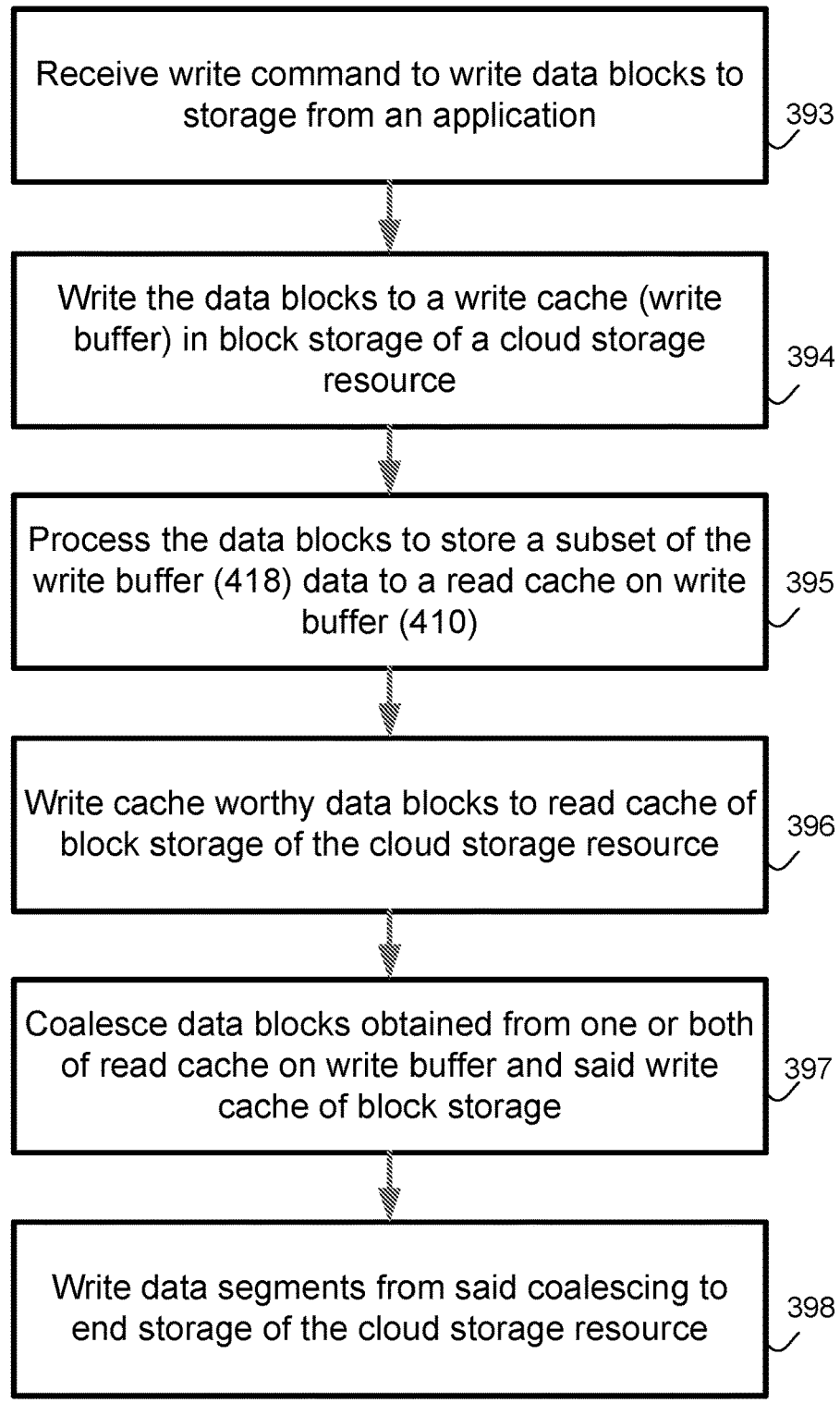
FIG. 9C illustrates a flow diagram of operations that may be processed by or through storage application, in accordance with one embodiment.

FIG. 9C illustrates a flow diagram of operations that may be processed by or through storage application 106, in accordance with one embodiment. In this example, the storage application 106 may receive a write command in operation 393 to write data blocks to storage from an application 108. As mentioned above, it is possible that storage application 106 will be servicing many applications 108 in parallel, and the various write commands received by the storage application 106 can be handled in various ways. In some embodiments, certain applications 108 can be given priority for processing, depending on the mission critical level of the write applications.

In other embodiments, quality of service processing can be performed to assign different priorities to different write commands. In other embodiments, the priorities can be dynamically adjusted over time, or based on the workload being experienced by application 106. Having received the data blocks in operation 393, the data blocks are written to a write cache in block storage of a cloud storage resource in operation 394. As described above, the write cache 202 is defined by one or more volumes 140, which are part of block storage 136. In operation 395, data blocks are processed to store a sub-set of the received data blocks in read cache-on-write buffer 340. For example, it is possible to write only a sub-set of the data blocks and/or metadata is stored to memory cache 340, while all of the data blocks are written to the write cache 202.

In another embodiment, it is possible to write all of the data blocks to the memory cache 340, and subsequently process an eviction process as described with reference to FIG. 6B. In operation 396, cache worthy data blocks are written to the read cache of Locke storage of the cloud storage resource. The read cache 204, will therefore receive cache worthy data blocks, which may be obtained from memory cache 340 and from write cache 202, if the blocks are not present in the memory cache 340. In operation 397, data blocks are coalesced while being obtained from one or both of the memory write cache 340 and the write cache 202 of the block storage 136.

For example, the coalescing logic may need to coalesce certain data blocks for a particular application, and only certain of those data blocks are present in the memory cache 340. In order to complete the generation of a data segment, for that application, data blocks are obtained from the write cache 202 and from the memory write cache 340. In operation 398, data segments that are generated by the coalescing, are written too object storage of the cloud storage resource. As mentioned above, object storage 134 will be more efficiently utilized, since data segments are of larger size, as compared to individual data blocks.

Part III: Storage Applications Executed in a Storage Array that Implements Sub-Set Logic to Identify and Handle Data Block Writes to an Read Cache-on-Write Buffer In the following description, examples will be provided that relate to methods and systems for processing write operations received from applications, which may be executed on one or more hosts having access to a storage array. By way of example, FIGS. 10-11C relate to examples of implementing the processing to maintain a sub-set of write data blocks on a read cache-on-write buffer of a storage array.

Figure 10:
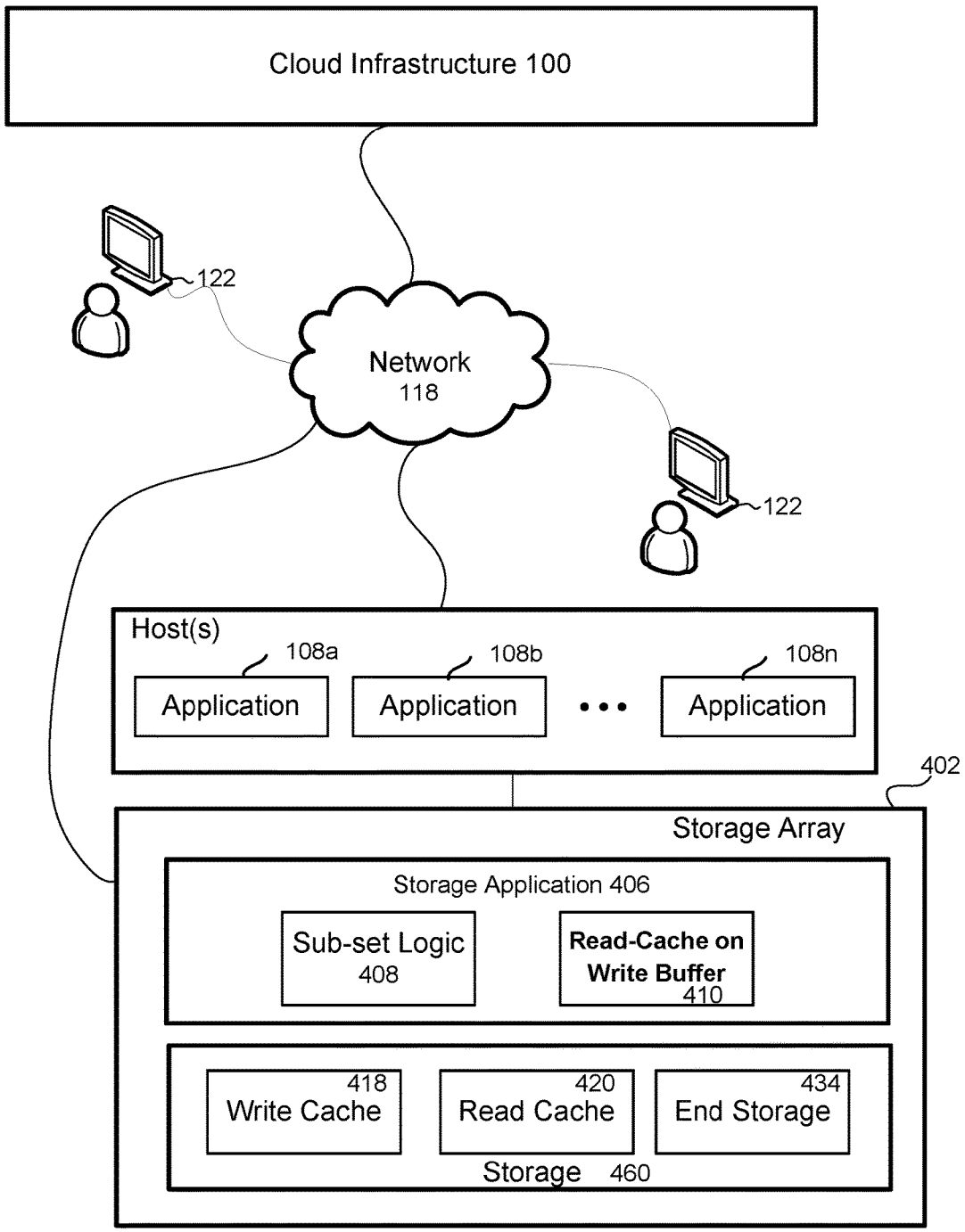
FIG. 10 illustrates an embodiment where a storage array is configured to service data access operations (e.g., writes and reads) of applications and use of a read cache-on-write buffer for storing a sub-set of write buffer data and/or metadata.

FIG. 10 illustrates an embodiment where a storage array 402 is configured to service data access operations (e.g., writes and reads) of applications 108a-108n. The applications 108a-108n may be executed by one more hosts, which can connect to the storage array 402 directly or via a network. In one embodiment, storage services provided by the storage array 402 are executed by a storage application 406, which utilizes storage 460 of the storage array 402. The storage array 402 is also shown interfaced with a network 118, and capable of connecting to cloud infrastructure 100. As mentioned previously, cloud infrastructure 100 can be utilized to store data processed by a storage array 402. By way of example, the cloud infrastructure 100 can be utilized to store coalesced data blocks (i.e., data segments) to object storage 134. The data segments stored in object storage 134 may be accessed for data recovery or simply used for snapshots or backups. In some embodiments, the storage array 402 will also store coalesced data blocks 206 to local storage, e.g., hard disk drives. For example, the coalesced data blocks will be stored as segments with sequentially ordered data blocks in segment storage 434. Some or all of the coalesced data blocks 206 may be stored to the object storage 134 of the cloud infrastructure 100. By way of example, storing/uploading from the segment storage to the object storage 134 of the cloud infrastructure 100 may occur from time to time. The timing of said uploads can be based on a schedule, or when processing in the storage array 402 falls below a safe level where said uploads or processing does not impact storage access operations by applications 108. In some embodiments, uploads to object storage 134 may occur on-demand in response to user input via a user interface or command line, or the like.

In the example of FIG. 10, the storage application 406 represents an operating system (OS) of the storage array 402. For example, for write operations of any one of the applications 108, the storage application 406 is configured to process sub-set logic 408, which is configured to control selection of data and/or metadata to store in a sub-set of write buffer data block 410. The sub-set logic 408 also functions as a pass-through to enable data blocks to be written to write cache 418 (i.e., write buffer). In an alternative embodiment, the sub-set logic 408 may be configured to write all of the data blocks received from one or more write operations from the applications 108 directly to read cache-on-write buffer 410, in addition to writing all of the data blocks to the write cache 418. In this mode, the read cache-on-write buffer 410 functions as a shadow cache. The storage 460 is also shown to include read cache 420. More details regarding the storage configuration of storage 460 and storage application 406 is provided with reference to FIG. 11A below.

In one implementation, the read cache-on-write buffer 410 is configured to store the data blocks associated with particular applications that have been identified as having a threshold of writing activity. Thus, only a sub-set of the data blocks will be stored in the read cache-on-write buffer 410. For example, if a certain application 108 is writing data blocks consistently during a period of time, and another certain application 108 is not writing data blocks frequently enough during said period of time, then data blocks from the infrequently writing application 108 may be evicted from the read cache-on-write buffer 410 or not written to the read cache-on-write buffer 410. In some embodiments, the read cache-on-write buffer 410 may be configured to receive only certain data blocks as controlled by sub-set logic 408, which may relate to one or more of said applications 108.

Thus, depending on the application performing the write operations, the sub-set logic 408 can select certain ones of the applications 108a-n so that their data blocks are written to read cache-on-write buffer 410, while data blocks not written to the read cache-on-write buffer 410 as determined by sub-set logic 408, will simply be written to the write cache 418. In one embodiment, the sub-set logic 408 operates to identify certain applications 108 that may be frequently writing data blocks. Those applications can be identified so that their storage of data blocks is made to the read cache-on-write buffer 410. If certain data blocks are stored in the read cache-on-write buffer 410, which are not associated with applications having a threshold level of writes or activity, then those data blocks can be evicted from the read cache-on-write buffer 410. As mentioned above, the sub-set logic 408 is configured to write all of the data blocks to the write cache 418, so if the eviction from the read cache-on-write buffer 410 occurs, the data will not be completely deleted.

Figure 11A:
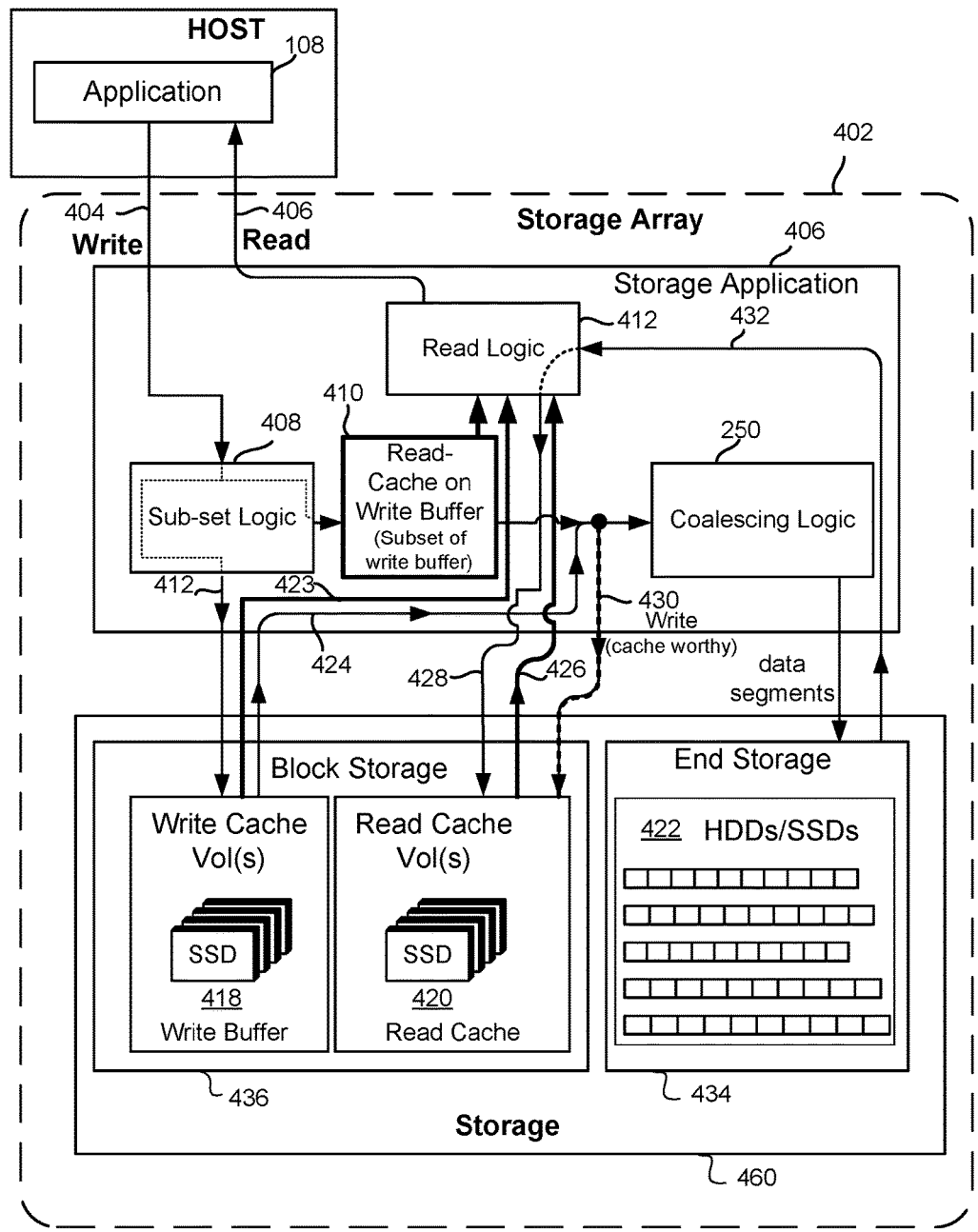
FIG. 11A illustrates an example storage array, which is interfaced with a host executing application, in accordance with one embodiment.

FIG. 11A illustrates an example storage array 402, which is interfaced with a host executing application 108, in accordance with one embodiment. In this example, the storage array 402 processes write operations 404 and read operations 406, responsive to commands received from the application 108 executed by the host. The host may be directly connected to the storage array by way of cabling, wireless, or via a network. The storage application 406 is configured to execute logic for processing the write and read operations. The processing by the storage application 406 is configured to utilize sub-set logic 408, which operates on data blocks for write operations 404. The sub-set logic 408 is further configured to pass-through all of the data blocks to the write cache 418. The write cache 418, in one embodiment, is defined by solid-state drives (SSDs). Read cache 420, in one embodiment, is also defined by SSDs.

Continuing with the writing operation processed by the sub-set logic 408, certain data blocks are also stored in the read cache-on-write buffer 410. As mentioned above, the storage application 406 can execute logic to identify when certain data blocks should be stored in the read cache-on-write buffer 410. By way of example, the logic can identify whether certain applications are generating a threshold number of read operations for data, and the data being written is likely to be read frequently. By way of example, the read cache-on-write buffer 410 can therefore operate as a hot write cache. As used herein, the term "hot" refers to certain data blocks having a likelihood of being read within a threshold period of time, or within some predefined interval.

That is, if certain data blocks are read often, such data blocks can be referred to as hot. The opposite is true when certain data blocks are not frequently read, and such data blocks can be referred to as "cold." In this configuration, the read cache-on-write buffer 410 is therefore configured to store a sub-set of write buffer data that are being written to the write cache 418. In this manner, read logic 412 of the storage application 402 can request reads from the read cache-on-write buffer 410 directly, and there is a higher likelihood that the data requested is still present in the read cache-on-write buffer 410, which speeds up the serving of data by the storage application 406.

If the data is not present in the read cache-on-write buffer 410, in response to a read operation 406, the read logic 412 will read the data from the write cache (write buffer) 418 via path 423, and if not found in the write buffer, then a read is made to the read cache 420 via path 426. As illustrated, the data blocks being written will also be processed by coalescing logic 250. Coalescing logic 250 will receive data blocks from the read cache-on-write buffer 410, and if such data blocks are not present in the read cache-on-write buffer 410, the coalescing logic 250 will retrieve the data blocks from the write cache 418, via path 424. Cache worthy data blocks will also be stored to the read cache 420 via path 430. In this manner, if a read operation 406 does not find the data blocks in the read cache-on-write buffer 410 or the write buffer 418, the read logic 412 will retrieve the data blocks from read cache 420 and return them to the application 408.

The coalescing logic 250 is configured to sequentially order the data blocks and create data segments that are then written to segment storage 434. In this example, hard disk drives (HDDs) or SSDs 422 may be used to store the data segments received from the coalescing logic 250. This storage is typically much larger, but slower, and can be generally referred to as end storage or storage. Coalescing logic 250 is configured to organize the data blocks in sequential order, and then write them to the segment storage 434. In some embodiments, the coalescing logic 250 can function as a drain to end storage 434. As mentioned above, compression can also be utilized to compress the coalesced data blocks before being written to the segment storage 434.

In some embodiments, it is also possible to store some or all of the data segments in the segment storage 434 to object storage 134 of the cloud infrastructure 100. This can function as a mirror copy of the data segments present on the storage array 402. The mirror copy can operate for disaster recovery, restoring from a cloud backup, or transitioning to storage operations to the cloud in case the storage array 402 goes down, or requires service. It should be understood that the data segments stored in the object storage 134 of the cloud infrastructure 100 can vary from including all data segments of the storage array 402, or select the data segments. For instance, data segments that are not often use can be stored in the cloud infrastructure object storage 134.

This methodology may allow for hot data to be stored primarily on the storage array 402 segment storage 434, while cold data can be stored in the object storage 134 in the cloud infrastructure 100. In some embodiments, the data that will be stored in the object storage 134 of the cloud infrastructure 100 may be identified based on volume type.

Some volumes require frequent access to the data, and such volumes may not be identified for continual update to the cloud storage. In other embodiments, some volumes do not require frequent access, and the cloud storage can maintain a complete copy of the data stored in such volumes. Still further, some embodiments may be configured to store all data in the segment storage 434 to the object storage 134 of the cloud infrastructure 100. Updates to the cloud can be performed periodically, on a schedule, or based on updates to the segment data present in the segment storage 434.

Continuing with FIG. 11A, the read operation performed by the read logic 412 of the storage application 406 may have to access the segment storage 434 if the data requested by the application 108 is not present in either the read cache-on-write buffer 410, the write buffer 418, or the read cache 420. In such case, the data blocks that require access can be read from the end storage 434 via path 432, and those data blocks are stored to read cache 420 via path 428. In some embodiments, the data retrieved from end storage is only saved in read cache 420 if it is considered cache worthy. If stored in read cache 420, and if those data blocks are requested again, e.g., by a processor application that is frequently accessing those data blocks, the access and return to the application can be from the read cache 420 via path 426.

As mentioned above, data reduction can be performed by the storage application 406 at different points in time along the processing of write operations. By way of example, reduction operations can be performed on the data before the data is handled by the sub-set logic 408. In another example, reduction operations can be performed before the data blocks are coalesced by the coalescing logic 250. As further mentioned earlier, the reduction operations can include various types of data reductions, such as de-duplication (i.e., de-dupe) processing, compression, garbage collection, or a combination thereof. The sub-set logic 408 is therefore optimized to store certain sub-sets of data blocks to the read cache-on-write buffer 410, in order to optimize the performance of the storage application 406.

Optimization of the storage application 406 results when the storage array 402 is able to service both write operations 404 and read operations 406 at a fast rate, without significant delays. It is believed that storing certain data blocks in the read cache-on-write buffer 410, e.g., having a sub-set of write buffer data, the storage application 406 is able to process read operations 406 more rapidly (and coalescing can be accelerated), as frequently accessed data may be still stored in the read cache-on-write buffer 410. In one configuration, by storing only a sub-set of the data blocks in the read cache-on-write buffer 410, the storage application 406 can be made more cost-effective since the size of the read cache-on-write buffer 410 can be reduced. As mentioned earlier, the read cache-on-write buffer 410 may be defined by random access memory (RAM), which is volatile by nature. Furthermore, it is possible to optimize the types of data that will be stored as the sub-set of write buffer data in the read cache-on-write buffer 410. In addition to or instead of storing hot data blocks, it is possible to identify data blocks that belong to a specific application.

Some applications can be pre-designated as requiring frequent accesses the data, such as databases. In other cases, certain applications will in frequently accessed data blocks, and data blocks for such applications can be pre-identified to not be stored in the read cache-on-write buffer 410 by the sub-set logic 408. Still further, the sub-set logic 408 can also be configured to remove data that is present in the read cache-on-write buffer 410, e.g., if such data becomes cold.

For instance, if certain data blocks remain in the read cache-on-write buffer 410 for a particular period of time, and no access or requests have been made such data blocks, the data blocks can be evicted or removed from the read cache-on-write buffer 410. In still other embodiments, predefined amounts of data can be reserved for certain applications in the read cache-on-write buffer 410. If a certain application exceeds the storage in the read cache-on-write buffer 410 that has been allotted for that application, data blocks can be evicted, or future data blocks for that application will not be stored in the read cache-on-write buffer 410. These configurations can be predefined as logic executed by the storage application 406. In other embodiments, these configurations can be manually set by a user during the configuration of the storage array 402. Configuration can be controlled via a user interface, or by a program, or from a remote computer connected to the storage array 402.

Figure 11B:
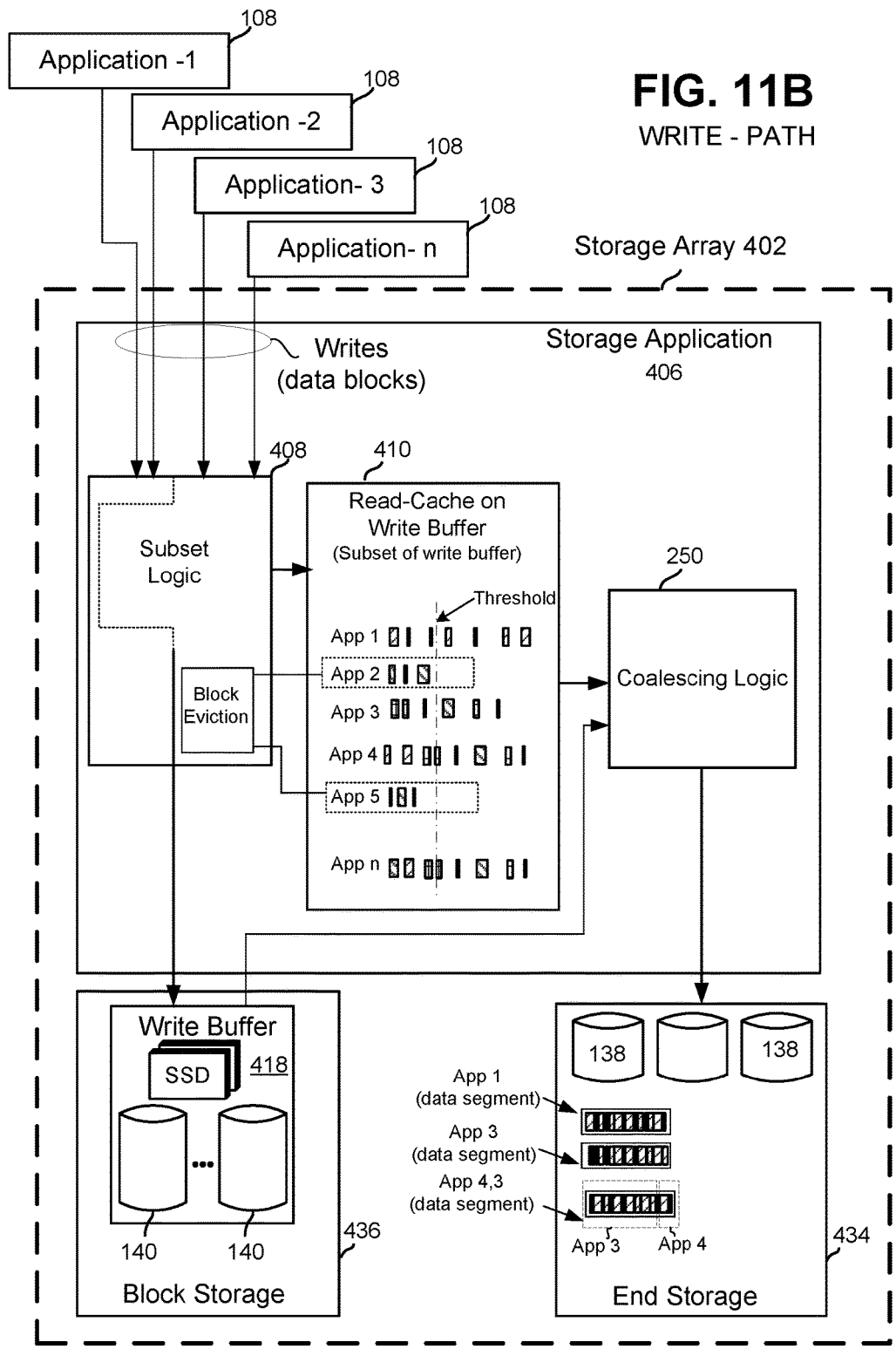
FIG. 11B illustrates an example of write-path processing for any number of applications that may be accessing storage of the storage array, and use of a read cache-on-write buffer for storing a sub-set of write buffer data and/or metadata.

FIG. 11B illustrates an example of write-path processing for any number of applications 108 that may be accessing storage of the storage array 402, and storage application 406 handles the access operations to the storage resources, such as block storage 436 and segment storage 434. In this example, sub-set logic 408 handles the receipt of write operations of data blocks from the various applications 108 that are utilizing the storage application 406 to access the storage of the cloud infrastructure. As shown, sub-set logic 408 is configured to write all of the data blocks to the block storage 436, such that the write cache 418 contains all written data blocks. In one embodiment, the sub-set logic 408 is configured to write a sub-set of write buffer data to the read cache-on-write buffer 410, as well as writing them to the write cache 418.

In one configuration, a threshold analysis is performed to determine whether certain ones of the applications 108 have written a threshold amount of data blocks to the read cache-on-write buffer 410. For example, if certain applications are writing data blocks too infrequently, they will not meet a threshold amount of writing activity (e.g., during a predetermined period of time or interval that is monitored) to remain in the read cache-on-write buffer 410. As shown, application 2 and application 5 have written data blocks to the read cache-on-write buffer 410, but application 2 and application 5 have not met the threshold required for remaining in the read cache-on-write buffer 340. Accordingly, the eviction of the data blocks associated with application 2 and application 5 will be evicted. In one embodiment, sub-set logic 408 includes block eviction logic, which is configured to evict data blocks from the read cache-on-write buffer 410 that have not met the threshold.

The threshold can be defined by the number of data blocks written over a period of time, or lack of data blocks written over a period of time, or data blocks that have been identified as hot, or applications that have been pre-identified as requiring storage to the read cache-on-write buffer 410, or a combination thereof. In one example, if certain applications are more active, such as applications 1, 3, 4, and n, the data blocks associated with those applications will remain in the read cache-on-write buffer 410 for a sufficient period of time until they can be identified for coalescing by coalescing logic 250. For example, coalescing logic 250 can identify data blocks from application 1 and application 3, which are then coalesced to create a data segment, which is written to segment storage 434. In one embodiment, coalesced data blocks that are written as data segments by coalescing logic 250 obtain data blocks from the read cache-on-write buffer 410, and certain blocks from write cache 418, in order to create a data segment having ordered data blocks for a specific application. For instance, it may be possible that certain data blocks for certain applications were evicted for lack of activity, but subsequently that application became more active.

At that point, coalescing logic 250 would be ready to construct data segments for that application, but certain data blocks would not be present in the read cache-on-write buffer 410. For this reason, coalescing logic 250 is configured to read certain data blocks from write cache 436 in order to construct the data segments that are written to segment storage 434. In an alternative embodiment, it is possible to write data segments that are composed of data blocks from two or more applications. In segment storage 434, it is shown that a data segment can be constructed from data blocks associated with applications 4 and 3. In some embodiments, data blocks can be constructed from more than two applications. In further embodiments, it should be understood that the data segments can have varying sizes. As mentioned above, typically data segments may have a size that is at least greater than 1 MB. By way of a non-limiting example, if data blocks are 4 KB, then the data segment may have 250 data blocks.

Figure 11C:
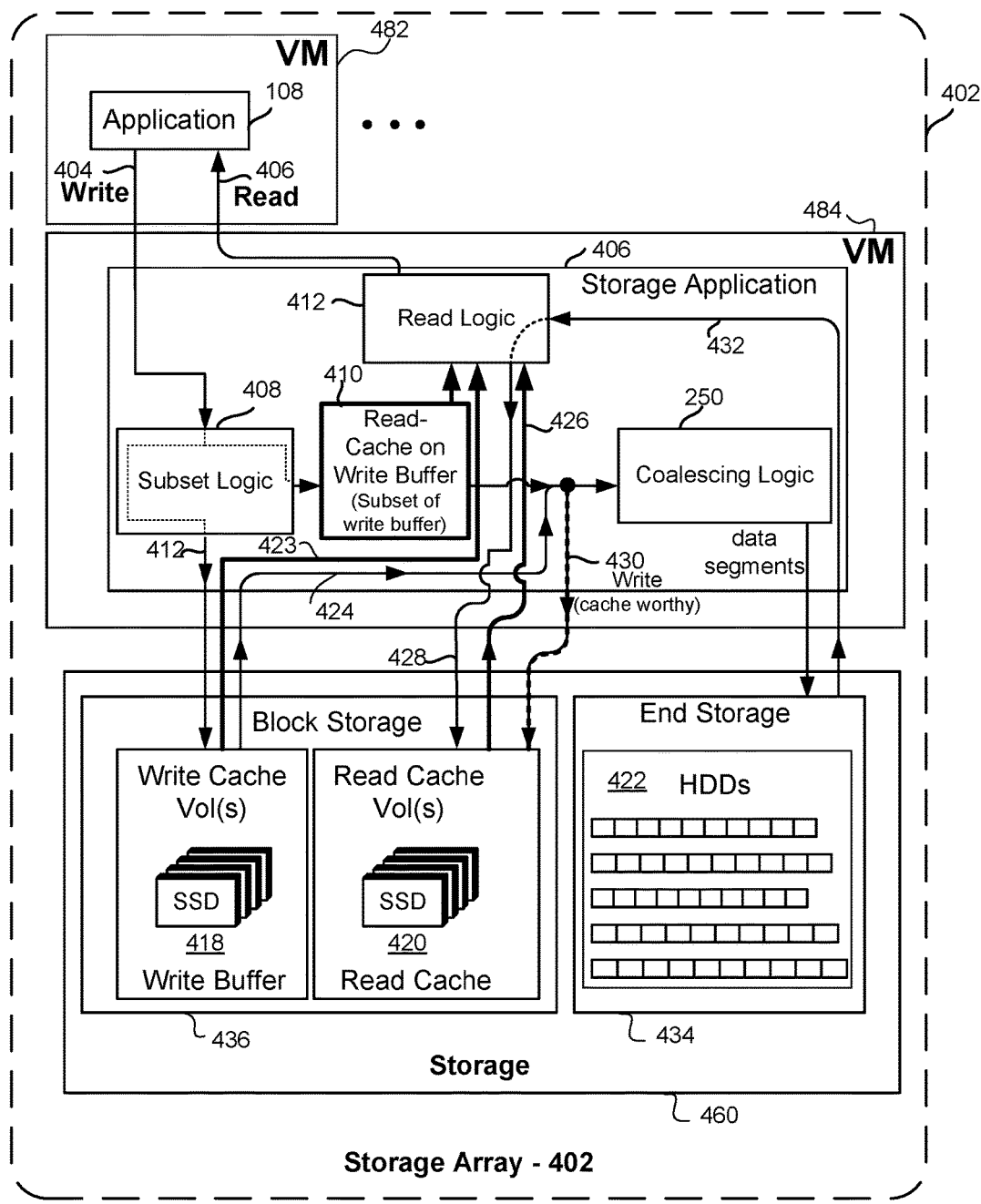
FIG. 11C illustrates an example where the storage application is executed in a virtual machine, process by the storage array, in accordance with one embodiment.

FIG. 11C illustrates an example where the storage application 406 is executed in a virtual machine 484, process by the storage array 402. In this configuration, application 108 is shown to also be executed in a virtual machine 482, processed by the storage array 402. This example shows that the virtual machine 482 executing the application 108, can utilize the storage processing of the storage application 406 processed by the virtual machine 484. In this configuration, the storage application 406 functions as the storage operating system or storage controller, and the application 108 simply utilizes the storage services of the storage application 408 by way of internal communication between virtual machines 482 and 484. This configuration defines a type of hyper converge storage solution, where the storage processing by the storage application 406 and the host processing of the application 108 are contained within the same storage array 402. In this configuration, the block storage 436 is defined by SSDs, and the segment storage 434 is defined by HDDs. In some configurations, the segment storage 434 can also be defined by SSDs, instead of HDDs, thus defining an all flash array.

It should be understood that the cloud storage system 130, 130a, and 130b described above are defined from storage resources provided by a cloud service provider, and namely the cloud infrastructure. The applications 108 operate in compute nodes, e.g. virtual machines, of the cloud service provider. The storage application 106, similarly operates in a compute node, e.g. virtual machine, of the cloud service provider. The applications 108 are configured to be mapped to the services provided by the storage application 106, to provide access to the storage resources, as described above. The infrastructure utilized by the actual storage resources may vary, and may be defined and individually provisioned by the cloud service provider. The cloud service provider, in its data centers, will utilize storage arrays that are defined from physical storage media. The storage arrays can be optimized in various ways. For instance, some storage arrays may be defined by hard disk drives, some storage arrays may be defined by solid-state drives, and some storage arrays may be defined as hybrid arrays, which include both hard drives and solid-state drives.

For purposes of completeness, the following discussion refers to attributes of a physical storage array, which may be utilized as a storage resource in the cloud infrastructure of the cloud service provider. In some embodiments, reference to NVRAM, in the context of the storage array 502, may parallel operations performed by memory cache 220 of the storage application 106. Cache worthy data written to solid-state drives in the storage array, will resemble operations that are performed when writing to the read cache 204 in a cloud storage system. Data written to the object storage 134, may parallel operations when data is written to the hard disk drives 532 in the storage array 502. Some of these operations performed by the storage application 106, in one embodiment, parallel to (at least in part) operations that are processed by a cache accelerated sequential layout (CASL) algorithm described below. It should be understood, that the CASL algorithm described with reference to the storage array 502 may not be identical to the operations performed by the storage application 106, but certain of the concepts may be implemented, or replaced, or substituted for operations performed by the storage application 106. With the foregoing in mind, the following description is with reference to a storage array 502.

Figure 12:
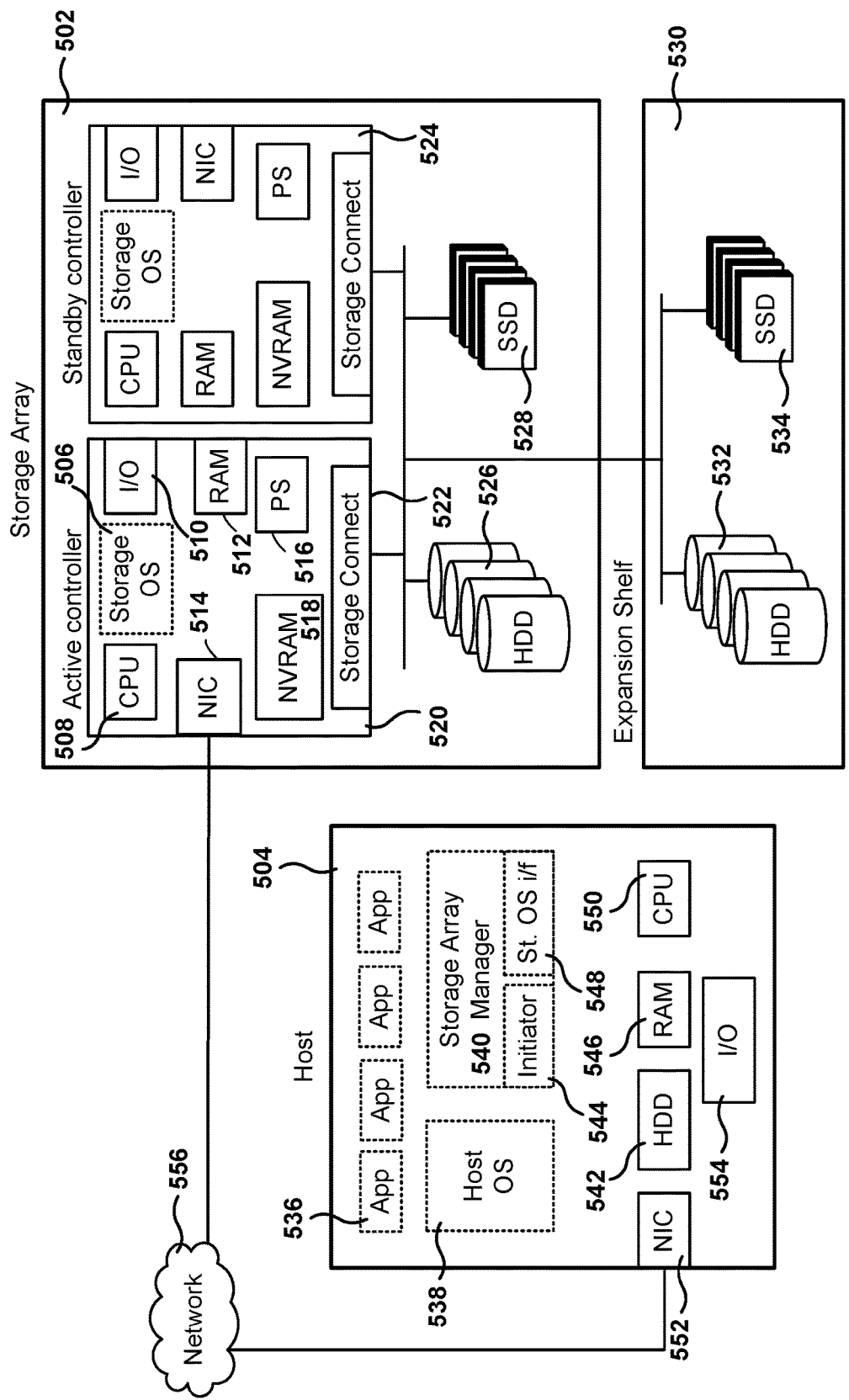
FIG. 12 illustrates an example architecture of a storage array, according to one embodiment.

FIG. 12 illustrates an example architecture of a storage array 502, according to one embodiment. In one embodiment, storage array 502 includes an active controller 520, a standby controller 524, one or more HDDs 526, and one or more SSDs 528. In one embodiment, the controller 520 includes non-volatile RAM (NVRAM) 518, which is for storing the incoming data as it arrives to the storage array. After the data is processed (e.g., compressed and organized in segments (e.g., coalesced)), the data is transferred from the NVRAM 518 to HDD 526, or to SSD 528, or to both.

In other configurations, no NVRAM 518 is used, and instead read cache-on-write buffer is used as either a shadow buffer that stores all writes or as read cache-on-write buffer that stores a sub-set of the written data blocks. Examples of using read cache-on-write buffer are provided throughout this application and in the drawings.

In addition, the active controller 520 further includes CPU 508, general-purpose RAM 512 (e.g., used by the programs executing in CPU 508), input/output module 510 for communicating with external devices (e.g., USB port, terminal port, connectors, plugs, links, etc.), one or more network interface cards (NICs) 514 for exchanging data packages through network 556, one or more power supplies 516, a temperature sensor (not shown), and a storage connect module 522 for sending and receiving data to and from the HDD 526 and SSD 528. In one embodiment, the NICs 514 may be configured for Ethernet communication or Fibre Channel communication, depending on the hardware card used and the storage fabric. In other embodiments, the storage array 502 may be configured to operate using the iSCSI transport or the Fibre Channel transport.

Active controller 520 is configured to execute one or more computer programs stored in RAM 512. One of the computer programs is the storage operating system (OS) used to perform operating system functions for the active controller device. In some implementations, one or more expansion shelves 530 may be coupled to storage array 502 to increase HDD 532 capacity, or SSD 534 capacity, or both.

Active controller 520 and standby controller 524 have their own NVRAMs, but they share HDDs 526 and SSDs 528. The standby controller 524 receives copies of what gets stored in the NVRAM 518 of the active controller 520 and stores the copies in its own NVRAM. If the active controller 520 fails, standby controller 524 takes over the management of the storage array 502. When servers, also referred to herein as hosts, connect to the storage array 502, read/write requests (e.g., IO requests) are sent over network 556, and the storage array 502 stores the sent data or sends back the requested data to host 504.

Host 504 is a computing device including a CPU 550, memory (RAM) 546, permanent storage (HDD) 542, a NIC card 552, and an IO module 554. The host 504 includes one or more applications 536 executing on CPU 550, a host operating system 538, and a computer program storage array manager 540 that provides an interface for accessing storage array 502 to applications 536. Storage array manager 540 includes an initiator 544 and a storage OS interface program 548. When an IO operation is requested by one of the applications 536, the initiator 544 establishes a connection with storage array 502 in one of the supported formats (e.g., iSCSI, Fibre Channel, or any other protocol). The storage OS interface 548 provides console capabilities for managing the storage array 502 by communicating with the active controller 520 and the storage OS 506 executing therein. It should be understood, however, that specific implementations may utilize different modules, different protocols, different number of controllers, etc., while still being configured to execute or process operations taught and disclosed herein.

In some embodiments, a plurality of storage arrays may be used in data center configurations or non-data center configurations. A data center may include a plurality of servers, a plurality of storage arrays, and combinations of servers and other storage. It should be understood that the exact configuration of the types of servers and storage arrays incorporated into specific implementations, enterprises, data centers, small office environments, business environments, and personal environments, will vary depending on the performance and storage needs of the configuration.

In some embodiments, servers may be virtualized utilizing virtualization techniques, such that operating systems can be mounted or operated using hypervisors to allow hardware and other resources to be shared by specific applications. In virtualized environments, storage is also accessed by virtual hosts that provide services to the various applications and provide data and store data to storage. In such configurations, the storage arrays can be configured to service specific types of applications, and the storage functions can be optimized for the type of data being serviced.

For example, a variety of cloud-based applications are configured to service specific types of information. Some information requires that storage access times are sufficiently fast to service mission-critical processing, while other types of applications are designed for longer-term storage, archiving, and more infrequent accesses. As such, a storage array can be configured and programmed for optimization that allows servicing of various types of applications. In some embodiments, certain applications are assigned to respective volumes in a storage array. Each volume can then be optimized for the type of data that it will service.

As described with reference to FIG. 10, the storage array 502 can include one or more controllers 520, 524. One controller serves as the active controller 520, while the other controller 524 functions as a backup controller (standby). For redundancy, if the active controller 520 were to fail, immediate transparent handoff of processing (i.e., fail-over) can be made to the standby controller 524. Each controller is therefore configured to access storage, which in one embodiment includes hard disk drives (HDD) 526 and solid-state drives (SSD) 528. As mentioned above, SSDs 528 are utilized as a type of flash cache, which enables efficient reading of data stored to the storage.

As used herein, SSDs functioning as "flash cache," should be understood to operate the SSD as a cache for block level data access, providing service to read operations instead of only reading from HDDs 526. Thus, if data is present in SSDs 528, reading will occur from the SSDs instead of requiring a read to the HDDs 526, which is a slower operation. As mentioned above, the storage operating system 506 is configured with an algorithm that allows for intelligent writing of certain data to the SSDs 528 (e.g., cache-worthy data), and all data is written directly to the HDDs 526 from NVRAM 518.

The algorithm, in one embodiment, is configured to select cache-worthy data for writing to the SSDs 528, in a manner that provides an increased likelihood that a read operation will access data from SSDs 528. In some embodiments, the algorithm is referred to as a cache accelerated sequential layout (CASL) architecture, which intelligently leverages unique properties of flash and disk to provide high performance and optimal use of capacity. In one embodiment, CASL caches "hot" active data onto SSD in real time—without the need to set complex policies. This way, the storage array can instantly respond to read requests—as much as ten times faster than traditional bolt-on or tiered approaches to flash caching.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In some implementations, SSDs 528 may be referred to as flash, or flash cache, or flash-based memory cache, or flash drives, storage flash, or simply cache. Consistent with the use of these terms, in the context of storage array 502, the various implementations of SSD 528 provide block level caching to storage, as opposed to instruction level caching. As mentioned above, one functionality enabled by algorithms of the storage OS 506 is to provide storage of cache-worthy block level data to the SSDs, so that subsequent read operations are optimized (i.e., reads that are likely to hit the flash cache will be stored to SSDs 528, as a form of storage caching, to accelerate the performance of the storage array 502).

In one embodiment, it should be understood that the "block level processing" of SSDs 528, serving as storage cache, is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 528 is implemented by algorithms exercised by the storage OS 506, which can differentiate between the types of blocks being processed for each type of application or applications. That is, block data being written to storage 530 can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 506, for efficient use of flash cache 528.

Continuing with the example of FIG. 10, that active controller 520 is shown including various components that enable efficient processing of storage block reads and writes. As mentioned above, the controller may include an input output (IO) 510, which can enable one or more machines to access functionality of the storage array 502. This access can provide direct access to the storage array, instead of accessing the storage array over a network. Direct access to the storage array is, in some embodiments, utilized to run diagnostics, implement settings, implement storage updates, change software configurations, and/or combinations thereof. As shown, the CPU 508 is communicating with storage OS 506.

Figure 13:
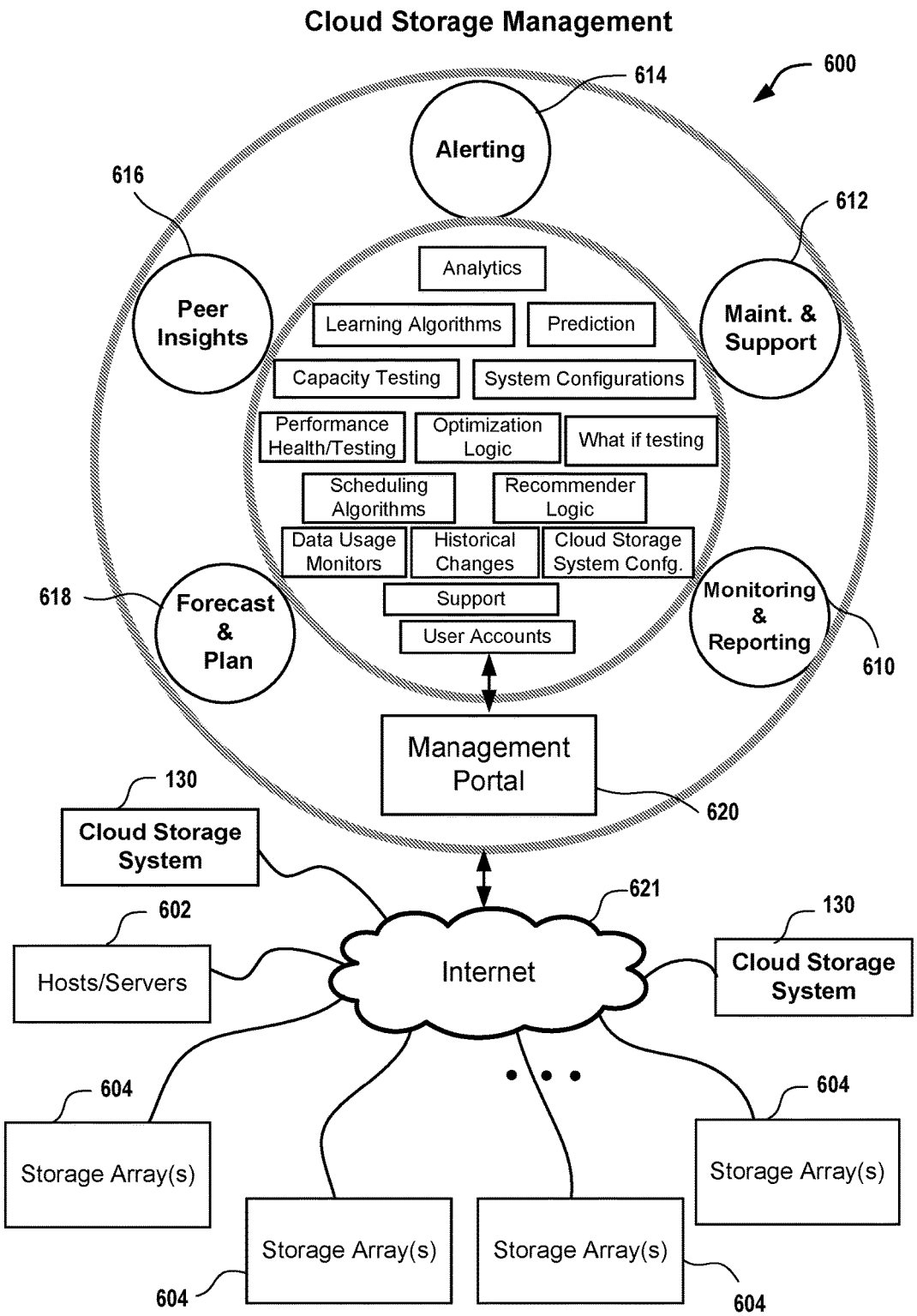
FIG. 13 illustrates an example of a cloud storage management system, which utilizes cloud storage processing to enable remote management of storage arrays, as well as cloud storage systems that may be implemented in a number of compute nodes, in accordance with one or more embodiments.

FIG. 13 illustrates an example of a cloud storage management system 600, which utilizes cloud storage processing to enable remote management of storage arrays, as well as cloud storage systems that may be implemented in a number of compute nodes, in accordance with one or more embodiments. As mentioned above, the cloud storage system is defined, in one configuration, by installing a storage application 106 in a compute node, e.g., a virtual machine, of cloud infrastructure of a cloud service provider. The storage application 106, in one embodiment, provides a layer that interfaces applications running on one or more virtual machines provisioned by the cloud service provider with storage of the cloud infrastructure. The storage application 106, in one embodiment, includes logic for communicating metadata regarding the storage handling with another process executing cloud storage management. By way of example, the other process executing the cloud storage management may be executed on the same cloud infrastructure of the cloud service provider, or may be executed on a remote server, or may be executed by a private server (virtualized or not) of the storage services provider that developed the storage application 106.

By way of example, the storage services provider may be the applicant of the present application, i.e., Nimble Storage Inc. The applicant of the present application may provide the operational components for the storage application 106, e.g., application loaders/installers, application engines, plug-ins, software, and/or containers, etc., for execution on compute node(s) of the cloud infrastructure. In one embodiment, the storage application 106 may operate as software as a service (SaaS), wherein the storage application 106 provides the functional and seamless interface between the application(s) 108 and the storage resources provides by the cloud infrastructure. The storage application 106 may be deployed in any number of cloud infrastructures, i.e., cloud infrastructures run by different cloud services providers. Today, well known cloud service providers include, by way of example and not limited in any way to many others, Amazon Web Services (AWS) by Amazon Inc., Google Cloud Platform, by Google, Inc., Microsoft cloud, by Microsoft Inc., etc.

In one embodiment, the cloud storage management system 600 executes a management portal 620 which provides access over the Internet, or local area networks (LAN), or wide area networks (WAN), and combinations thereof.

As shown, exemplary hosts and servers 602 are in communication with the Internet and are configured to provide services to a plurality of clients. As noted above, the clients access the Internet to utilize applications, services, processing, content, and share information and data. The data being accessed and shared or processed may be stored in a plurality of storage arrays 604 or may be gathered from installed storage applications 106, each of which may be functioning as a cloud storage system 130. Management of the data from cloud storage systems 130 is provided by enabling communication between the storage applications 106, when it is serving storage needs for one or more applications 108. Over time, the storage processing providing by storage application 106 can act to collect metadata that is useful to identify trends, storage needs, capacity requirements, and usage of different types of storage resources, e.g., block storage, object storage, or even long term storage. In some cases, this metadata gathered from installed storage applications 106 can be analyzed to find trends, project needs, or even instruct a change in the way storage resources are used.

In still other embodiments, the metadata can be used to generate recommendations to users of the application 106, which may optimize the way storage resources are used in the cloud infrastructure. In other embodiments, the received metadata is used to make dynamic changes to provisioned storage resources. For instance, if less block storage is used than what was initially provisioned, the amount of block storage reserved or paid for by the customer executing application 108 can be adjusted. This can provide for further cost savings, as adjustments can be made dynamically and in some embodiments, continuously to provide fine grain changes and modifications.

In some embodiments, in addition to receiving metadata from storage applications 106, 306 and 406, metadata can also be received from storage arrays 604, which can include storage arrays 502 and/or 402. These storage arrays may be installed in customer locations (i.e., companies or datacenters). In some embodiments, customers that use the storage application 106 or use a supported storage array 604, may be provided with access to a management portal 620. For example, the storage arrays 604 and the compute nodes that operate storage applications 106 may connect to a network 621, and in turn share information with a cloud storage management system 600. The cloud storage management system 600 is configured to execute a plurality of functions and algorithms to facilitate management of the storage application 106 (e.g., the cloud storage systems 103) and storage arrays 604 which may be deployed in various configurations, locations, datacenters, implementations, and other constructs. In some cases, a customer may not have storage array 604 provisioned, and the only information provided by the cloud storage management system 600 is with regard to one or more cloud storage systems 103.

In some embodiments, applications 108 may be used to service real-time data delivery to various applications over the Internet, such as on-demand applications, gaming systems, websites, streaming networks, video content delivery systems, audio content delivery systems, database information, business metrics, remote desktop applications, virtualized network infrastructures, and other storage related functions and/or Internet and website related processing. All of this processing may generate unique types of traffic flows and unique demands on cloud storage infrastructure. As such, the storage application 106 is well suited in the write and read data path, to track storage usage metrics. These metrics are broadly referred to as metadata, which is collected by the cloud storage management. As mentioned above, the cloud storage management may be operating on a different machine, in the same cloud infrastructure, or a different cloud infrastructure. The metadata, no matter where collected and processed, can be used to generate the aforementioned recommendations and/or dynamic changes to the usage of storage (i.e., usage of block storage and usage of object storage, in the context of a cloud storage system 103).

In some implementations, the cloud storage management 600 can include and process various modules to assist in efficient management of cloud storage systems 103 and/or storage arrays 604. Without limitation, the following are certain types of processing algorithms and methods that can be executed by the cloud storage management system 600, based on metadata received. These examples can include analytics processing to determine usage of storage, similarities in usage of storage by different applications 108, performance of applications based on certain configuration sets, and other modifications and analytics associated therewith. Still further, the cloud storage management system 600 can also include logic for processing learning algorithms.

The learning algorithms can be utilized to determine when certain configurations of storage should be implemented, based on previous settings and/or changes made by the same implementer of the storage application 106 or by looking for similarities and changes made or settings made by other storage application 106 implementers or users. Algorithms can also be used to predict when certain settings should be changed. These predictions can be ranked based on the success of certain changes over time, and based on the success experienced by such specific changes.

In another embodiment, capacity testing can also be performed by the cloud storage management system 600, and this testing can occur based on the demands being made on the storage, the types of applications being run, and the stress that the storage system 103 has been placed under. System configurations can also be reviewed dynamically by the cloud storage management system so as to determine if the write consistent configurations have been set, and/or provide recommendations for changes. Additional performance and health testing algorithms can also be run by querying and sending data, commands, analytics requests and other logic and data to and from the storage application 106. In one embodiment, recommendations can be sent to administrators of applications 108 and/or users of storage application 106, who may determine to implement or not implement certain recommendations and/or settings. In other embodiments, certain upgrades, changes, modifications and/or the like, can be implemented based on pre-defined settings, authorizations, or implicit settings and/or authorizations by a user, IT manager, storage manager, data center manager, or other authorized storage management personnel. Still further, the cloud storage management system 600 can also manage historical changes made, and determine when changes have been successful or have reduced the performance and/or goal desired by the implementing individual.

By analyzing historical changes and/or data from various cloud storage systems 130 (even when the cloud storage systems are operated by different entities), it is possible to identify optimizations at cross points or intersections of efficiencies, and such data can be used to provide recommendations for improved optimizations. The system can also include scheduling algorithms which can be used to automatically communicate with the storage application 106, collect data, run additional applications or routines, run logic, collect data, send optimizations, make recommendations, and/or adjust settings. In some embodiments, the management portal can also access support data which may be optimized for specific user accounts. For example, some analytics, data processing, optimizations, what if testing, recommender logic, and other functions can be limited to specific accounts, based on their level of service desired. In some embodiments, higher levels of service or support can be given higher levels of feedback by the cloud storage management system 600.

Broadly speaking, the functionality of the various algorithms managed by the cloud storage management system 600 can be used to provide specific functionality. Example functionality may include monitoring and reporting functions 610, maintenance and support functions 612, alerting functions 614, peer insights 616, and forecasting and planning 618. These various functions can take and use logic described above and defined within the inner diagram of the cloud storage management system 600. In various examples, the portal management can provide access to the plurality of user interface screens with selection boxes, setting boxes, metrics analysis, diagrams, charts, historical data, alerts, recommendations, and other user interface and/or command-line data. In other embodiments, changes to the cloud storage system 103 can be made, e.g., by changing configuration data.

In one embodiment, the storage lifecycle data (e.g., historical data, metadata, etc.) is leveraged to enable deep analysis of data regarding a storage application 106, 306, or 406. This analysis enables the automation and integration of data mining from, e.g., storage application 106 usage and functionality to automate and simplify storage administrative tasks. For instance, by analysis of metadata across various storage applications 106, 306, 406, it is possible to predict when configuration issues may arise for particular customer configurations. In some embodiments, this information may be used to determine when upgrades from one configuration (e.g., software and/or hardware) are recommended or when certain upgrades should be avoided. In one embodiment, having access to metadata of other applications 106, 306, 406 and/or other arrays 604, 502, 402 (e.g., across many disparate installations) allows for efficient diagnosis of current issues, potential issues or recommendations to ensure optimal health of particular cloud implementations of cloud storage systems 130.

For more information regarding storage systems, functions, features, operations, scale-out configurations, all flash arrays, hybrid arrays, and/or system components, reference may be made to U.S. patent application Ser. No. 14/748,179, filed on Jun. 23, 2015, which claims priority to U.S. Provisional Patent Application No. 62/058,015, filed on Sep. 30, 2014. Reference may also be made to U.S. Provisional Patent Application No. 62/396,050, filed on Sep. 16, 2016, and entitled "Cloud Storage System." Each of these applications is incorporated herein by references for all purposes.

It should be apparent, that the present embodiments may be practiced without some or all of these specific details. Modification to the modules, code and communication interfaces are also possible, so long as the defined functionality for the storage array or modules of the storage array is maintained. In other instances, well-known process operations have not been described in detail in order not to unnecessarily obscure the present embodiments.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A method for storage processing on a storage array, comprising,
    executing, by a processor, a storage application on the storage array to process write commands and read commands to and from storage of the storage array, the write commands and the read commands being from an application;
    processing, by the processor, a write command from the application to store data blocks of the write command to a memory cache and to a write buffer of a block storage that is part of the storage of the storage array;
    selecting, by the processor, a subset of the data blocks from the memory cache and writing said subset of data blocks to a read cache of the block storage;
    coalescing, by the processor, the data blocks obtained from the memory cache to produce data segments, wherein each of the data segments includes two or more of said data blocks; and
    writing, by the processor, the produced data segments to a segment storage that is part of the storage of the storage array.

2. The method of claim 1, further comprising,
    processing, by the processor on the storage application, a read command from the application, the processing includes, reading data blocks from said read cache of the block storage; and
    for data blocks not found in the read cache, reading from said write buffer of block storage.

3. The method of claim 2, further comprising,
    for data blocks not found in write buffer, reading from said segment storage.

4. The method of claim 1, wherein the subset of data blocks written to the read cache is identified as associated with the application.

5. The method of claim 1, further comprising,
examining the subset of data blocks written to the read cache to determine if a threshold amount of data blocks is present for the application in the read cache during a period of time; and
evicting one or more of the data blocks from the read cache when the threshold amount of data blocks is not present in the read cache during the period of time.

6. The method of claim 5, further comprising:
coalescing the data blocks evicted from the read cache to produce additional data segments corresponding to the application, wherein each of the additional data segments includes two or more data blocks arranged in a sequential order.

7. The method of claim 1, wherein the subset of data blocks written to the read cache is identified as associated with the application, the method further comprising,
examining the data blocks written to the read cache to determine if a threshold amount of data blocks is present in the read cache during a period of time; and
evicting the data blocks of selected ones of said applications that have written data blocks below the threshold amount during the period of time, wherein the evicting of the data blocks is for data blocks determined to be cold, and maintaining data blocks in the read cache which have determined to be hot during the period of time.

8. The method of claim 7, further comprising: coalescing the evicted data blocks to produce additional data segments that substantially correspond to a respective one of said applications.

9. The method of claim 1, wherein the read cache is to store data blocks for one or more other applications that are writing, the method further includes,
maintaining data blocks in the read cache associated with applications that are writing a threshold amount of data blocks during a period of time in the read cache, and evicting data blocks from the read cache associated with applications that store less than the threshold amount of data blocks during the period of time, wherein the data blocks that are maintained in the read cache during the period of time are determined to be hot, and the data blocks that are evicted from the read cache are determined to be cold during the period of time.

10. The method of claim 1, further comprising,
compressing the data blocks obtained from the memory cache,
wherein the subset of data blocks written to the read cache is selected from the compressed data blocks.

11. The method of claim 1, wherein the selected subset of data blocks is identified as cache worthy based on a determination that the selected subset of data blocks is likely to be read by the application.

12. The method of claim 1, wherein each of the write buffer and the read cache includes logical volumes that are pre-selected to store data associated to specific applications or specific types of data.

13. The method of claim 1, wherein the coalescing includes compressing the data blocks and arranging the compressed data blocks in a sequential order to produce said data segments, wherein said storage application is an operating system of said storage array.

14. The method of claim 1, wherein said data segments have a size of at least one megabyte and said data blocks have a size that is less than one megabyte, the size of said data segments acting to optimize writing to said segment storage and wherein the data blocks written to each of said write buffer and said read cache of said block storage represent random input/output (I/O) storage operations.

15. The method of claim 1, further comprising,
processing, by the processor, a reduction process on the data blocks obtained from the memory cache before being stored to said write buffer and said read cache, wherein said reduction process is one of a compression operation, or a de-duplication operation.

16. A non-transitory computer readable medium storing instructions that when executed cause a processor to:
execute a storage application of a storage array to process write commands and read commands to and from storage of the storage array, the write commands and the read commands being from an application;
process a write command from the application to store data blocks of the write command to a memory cache and to a write buffer of a block storage that is part of the storage array;
select a subset of the data blocks from the data blocks in the memory cache and write the subset of data blocks to a read cache of the block storage;
coalesce the data blocks obtained from the memory cache to produce data segments, wherein each of the data segments includes two or more of said data blocks; and
write the produced data segments to a segment storage that is part of the storage array.

17. The non-transitory computer readable medium of claim 16, further comprising instructions that cause the processor to:
process a read command from the application, wherein the processing of the read command causes reading data blocks from the storage array;
determine whether the data blocks for the read command are present in the memory cache;
in response to a determination that the data blocks are not present in the memory cache, determine whether the data blocks are present in the read cache of the block storage; and
in response to a determination that the data blocks are not present in the read cache, determine whether the data blocks are present in said write buffer of the block storage.

18. The non-transitory computer readable medium of claim 17, wherein the instructions further cause the processor to:
in response to a determination that the data blocks are not found in the write buffer, obtain the data blocks from said segment storage.

19. The non-transitory computer readable medium of claim 16, wherein the data blocks written to read cache are identified as associated with the application or as associated with other applications, and wherein the instructions further cause the processor to:
examine the data blocks written to read cache to determine if a threshold amount of data blocks is present in the read cache during a period of time for each of said applications; and
evict the data blocks of selected ones of said applications that have written data blocks below the threshold amount during the period of time, wherein the evicting of the data blocks is for data blocks determined to be cold while maintaining data blocks in the read cache that have determined to be hot during the period of time.

20. A method for storage processing on a storage array, comprising, executing a storage application on the storage array to process write commands and read commands to and from storage of the storage array, the write commands and the read commands being from an application;

storing data blocks of a write command from the application to a memory cache and a write buffer of the storage array;

processing said data blocks in the memory cache to identify a subset of the data blocks from the memory cache to store in a read cache of the storage array, wherein only the sub-set of data blocks is temporarily stored in said read cache of the storage array; and draining the subset of data blocks from said read cache a segment storage of said storage array, said draining includes producing data segments that include two or more of said data blocks in the subset.

21. The method of claim 20, further comprising, processing, by the processor on the storage application, a read command from the application, wherein the processing of the read command causes reading data blocks from the storage array;

initially reading data blocks from said read cache of the block storage; and for data blocks not found in the read cache, reading the data blocks from said write buffer of the block storage.

22. The method of claim 21, further comprising, for data blocks not found in the write buffer, reading the data blocks from the segment storage.

* * * * *